US011120452B2

(12) United States Patent
Edwards et al.

(10) Patent No.: US 11,120,452 B2
(45) Date of Patent: Sep. 14, 2021

(54) MULTI-FACTOR AUTHENTICATION (MFA) ARRANGEMENTS FOR DYNAMIC VIRTUAL TRANSACTION TOKEN GENERATION VIA BROWSER EXTENSION

(71) Applicant: Capital One Services, LLC, McLean, VA (US)

(72) Inventors: Joshua Edwards, Philadelphia, PA (US); Adam Vukich, Alexandria, VA (US); Abdelkader M'Hamed Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/183,971

(22) Filed: Nov. 8, 2018

(65) Prior Publication Data

US 2020/0151724 A1 May 14, 2020

(51) Int. Cl.
*G06Q 20/40* (2012.01)
*G06Q 40/00* (2012.01)
*G06Q 20/34* (2012.01)
*G06Q 20/12* (2012.01)

(52) U.S. Cl.
CPC ........... *G06Q 20/409* (2013.01); *G06Q 20/12* (2013.01); *G06Q 20/351* (2013.01); *G06Q 20/40* (2013.01); *G06Q 40/00* (2013.01)

(58) Field of Classification Search
CPC .............. G06Q 20/341; G06Q 20/352; G06Q 20/3278; G06Q 20/3672; G06Q 20/40; G06Q 20/4014; G06Q 40/00
USPC ...................... 705/26.1, 44, 67; 235/380, 382
See application file for complete search history.

(56) References Cited

U.S. PATENT DOCUMENTS

| 9,021,565 | B2 * | 4/2015 | Novack | H04L 9/3231 |
| | | | | 713/186 |
| 9,240,009 | B2 * | 1/2016 | Koh | G06Q 20/352 |
| 9,692,758 | B2 * | 6/2017 | Zeljkovic | H04L 9/3231 |
| 9,813,236 | B2 * | 11/2017 | Buer | G06F 21/34 |
| 9,853,977 | B1 * | 12/2017 | Laucius | H04L 63/0884 |
| 10,210,516 | B2 * | 2/2019 | Koh | G06Q 20/352 |
| 10,515,361 | B2 * | 12/2019 | Zarakas | G06Q 20/3278 |

(Continued)

FOREIGN PATENT DOCUMENTS

| EP | 3343495 A1 * | 7/2018 | ......... G06Q 20/3226 |
| JP | 2018521437 A * | 8/2018 | ......... G06Q 20/3226 |

OTHER PUBLICATIONS

Kiljan, Sven, et al. "A survey of authentication and communications security in online banking." (2016) ACM Computing Surveys (CSUR) 49.4 (2016): 1-35. (Year: 2016).*

*Primary Examiner* — Kelly S. Campen
(74) *Attorney, Agent, or Firm* — Kacvinsky Daisak Bluni PLLC

(57) ABSTRACT

Provided are arrangements requiring additional multi-factor authentication (MFA) in certain instances of dynamic virtual transaction token (e.g., virtual credit card token) generation via a browser extension. In the arrangements, the browser extension, when executed, may cause a browser to require a user to complete an initial multi-factor authentication (MFA). Once the browser extension has a record indicating a prior valid initial MFA for the user, the user allowed to request a transaction token. The browser extension may allow issuance of the transaction token upon an indication that the value needed does not exceed the predetermined value.

15 Claims, 13 Drawing Sheets

(56) References Cited

U.S. PATENT DOCUMENTS

| | | | |
|---|---|---|---|
| 2004/0034774 A1* | 2/2004 | Le Saint | G06F 21/34 |
| | | | 713/169 |
| 2005/0097060 A1* | 5/2005 | Lee | G06Q 20/045 |
| | | | 705/65 |
| 2007/0067828 A1* | 3/2007 | Bychkov | G06F 21/31 |
| | | | 726/3 |
| 2007/0132548 A1* | 6/2007 | Baraz | G07F 7/0866 |
| | | | 340/5.6 |
| 2012/0129452 A1* | 5/2012 | Koh | G06Q 20/352 |
| | | | 455/41.1 |
| 2012/0130838 A1* | 5/2012 | Koh | G06Q 20/352 |
| | | | 705/26.1 |
| 2012/0130839 A1* | 5/2012 | Koh | G06Q 20/352 |
| | | | 705/26.1 |
| 2013/0097682 A1* | 4/2013 | Zeljkovic | H04L 9/3231 |
| | | | 726/7 |
| 2015/0112871 A1* | 4/2015 | Kumnick | G06Q 20/382 |
| | | | 705/67 |
| 2015/0215316 A1* | 7/2015 | Zeljkovic | H04L 9/3231 |
| | | | 726/6 |
| 2016/0275504 A1* | 9/2016 | Koh | G06Q 20/352 |
| 2017/0180343 A1 | 6/2017 | De Ganon et al. | |
| 2018/0075447 A1 | 3/2018 | Moreton et al. | |
| 2019/0026727 A1* | 1/2019 | Wilson | G06Q 20/12 |
| 2019/0034911 A1* | 1/2019 | Wilson | G06Q 20/34 |
| 2019/0034912 A1* | 1/2019 | Wilson | G06Q 20/354 |
| 2019/0087813 A1* | 3/2019 | Wilson | G06Q 20/3278 |
| 2019/0114619 A1* | 4/2019 | Wilson | G06F 21/77 |
| 2019/0122215 A1* | 4/2019 | Trivedi | G06Q 20/3278 |

* cited by examiner

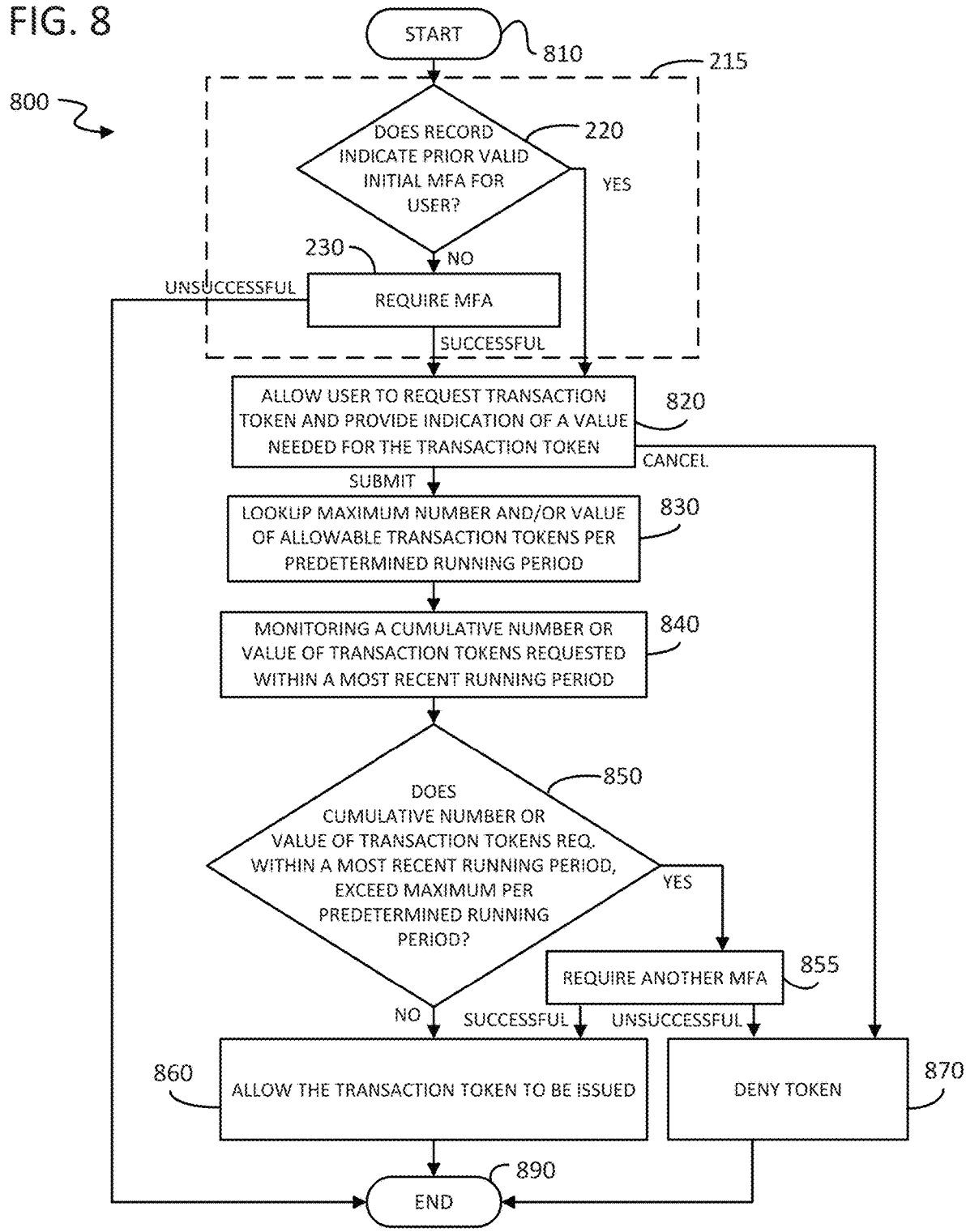

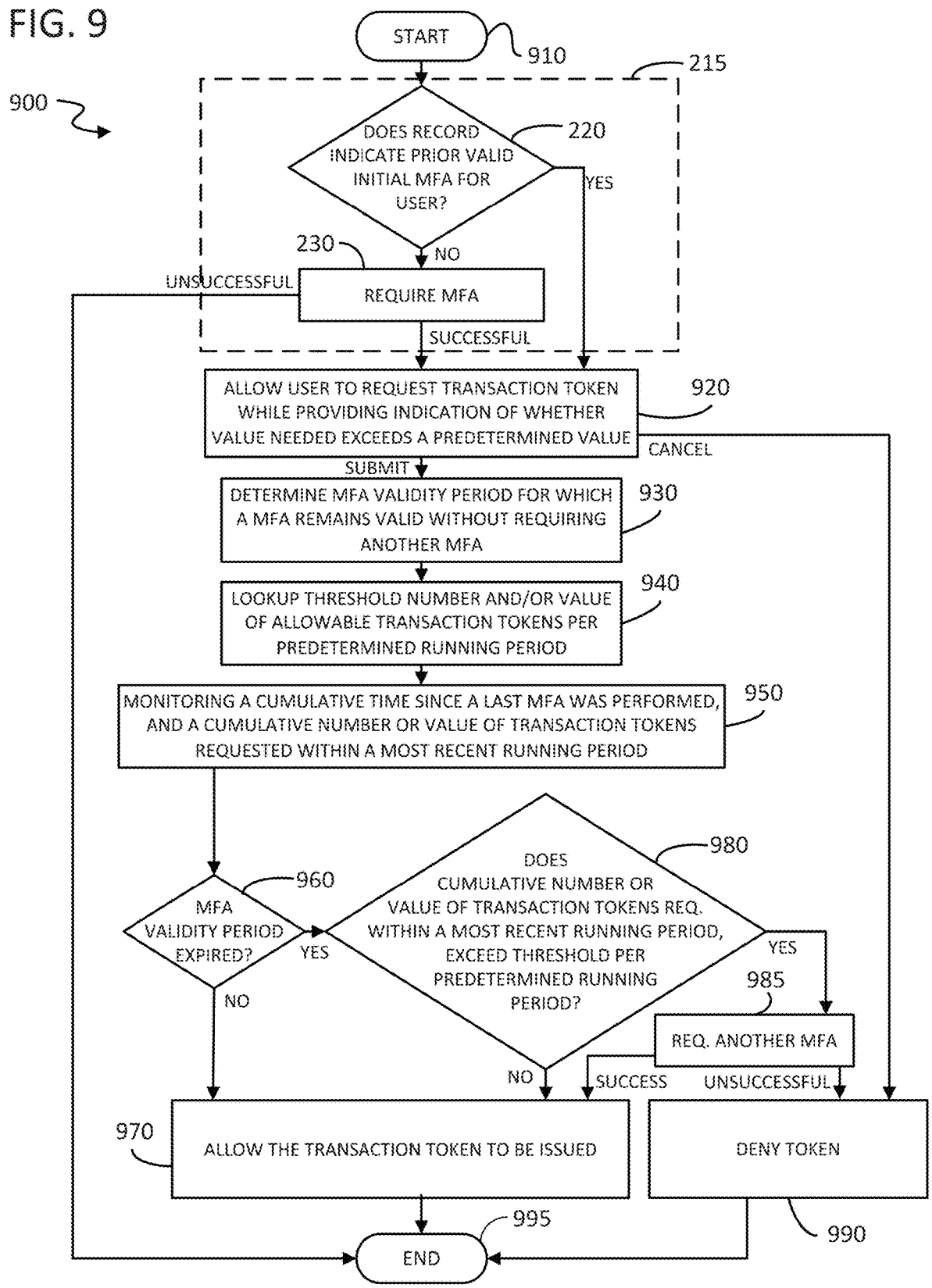

| | 1010 | 1020 | 1030 | 1040 | 1050 | 1060 | 1064 | 1068 | 1070 | 1080 | 1095 |
|---|---|---|---|---|---|---|---|---|---|---|---|
| | Last_Name | First_Name | Password | USPredVal | US#Tokens | USRunPeriod | USMaxVPerP | USMaxTPerP | USCredLimit | USAuthLspan | |
| 1005 | | | | | | | | | | | |
| 1015 | Doe | John | ******** | $100.00 | 10 | 2 days | $600.00 | 4 | $2,000.00 | 1 day | ••• |
| 1025 | Doe | Mary | ******** | $100.00 | 12 | 4 days | $800.00 | 5 | $5,000.00 | 2 days | ••• |
| 1035 | Doe | Jimmy | ******** | $50.00 | 4 | 2 days | $100.00 | 2 | $500.00 | 1 day | ••• |
| 1045 | ••• | ••• | ••• | ••• | ••• | ••• | ••• | ••• | ••• | ••• | ••• |

| | 1110 | 1120 | 1130 | 1140 | 1150 | 1160 | 1170 | 1180 | 1190 | 1192 |
|---|---|---|---|---|---|---|---|---|---|---|
| | Last_Name | First_Name | Password | Vendor_A | Pred_ValA | #_TokensA | Vendor_B | Pred_ValB | #_TokensB | |
| 1105 | | | | | | | | | | |
| 1115 | Doe | John | ******** | CompanyAP | $100.00 | 10 | CompanyKB | $200.00 | 8 | ••• |
| 1125 | Doe | Mary | ******** | CompanyPH | $100.00 | 10 | CompanyBP | $150.00 | 3 | ••• |
| 1135 | Doe | Jimmy | ******** | CompanyKA | $50.00 | 5 | | | | ••• |
| 1145 | ••• | ••• | ••• | ••• | ••• | ••• | ••• | ••• | ••• | ••• |

FIG. 12
1200

| | 1210 | 1220 | 1230 | 1240 | 1250 | 1260 | 1270 | 1280 | 1290 |
|---|---|---|---|---|---|---|---|---|---|
| | Last_Name | First_Name | Password | Vendor | Pred_Valu1 | Location | Category | Pred_Valu2 | |
| 1215 | Doe | John | ******** | CompanyPJ | $100.00 | CountryA-East | Apparel | $200.00 | *** |
| 1225 | Doe | John | ******** | CompanyPJ | $100.00 | CountryA-East | Electronics | $400.00 | *** |
| 1235 | Doe | John | ******** | CompanyPJ | $100.00 | CountryA-West | Apparel | $200.00 | *** |
| 1245 | Doe | John | ******** | CompanyPJ | $100.00 | CountryA-West | Electronics | $400.00 | *** |
| 1255 | Doe | John | ******** | CompanyKA | $50.00 | Country X | All | $50.00 | *** |
| 1265 | *** | *** | *** | *** | *** | *** | *** | *** | *** |

FIG. 13
1300

| | 1310 | 1320 | 1330 |
|---|---|---|---|
| | Vendor | VSAuth1span | |
| 1315 | CompanyAP | 2 days | *** |
| 1325 | CompanyKB | 2 days | *** |
| 1335 | CompanyPH | 1 day | *** |
| 1345 | *** | *** | *** |

FIG. 14
1400

| | 1410 | 1420 | 1430 | 1440 | 1450 | 1460 |
|---|---|---|---|---|---|---|
| | Vendor | Location | Category | FraudIndx | SSAuth1span | |
| 1415 | CompanyPH | Country164 | Electronics | 6 | 15 days | *** |
| 1425 | CompanyPH | Country133 | Software | 4 | 15 days | *** |
| 1435 | CompanyPH | Country107 | Electronics | 11 | 12 days | *** |
| 1445 | CompanyBP | Country221 | Eyeglass | 3 | 15 days | *** |
| 1455 | CompanyBP | Country784 | Electronics | 76 | 1 day | *** |
| 1465 | *** | *** | *** | *** | *** | *** |

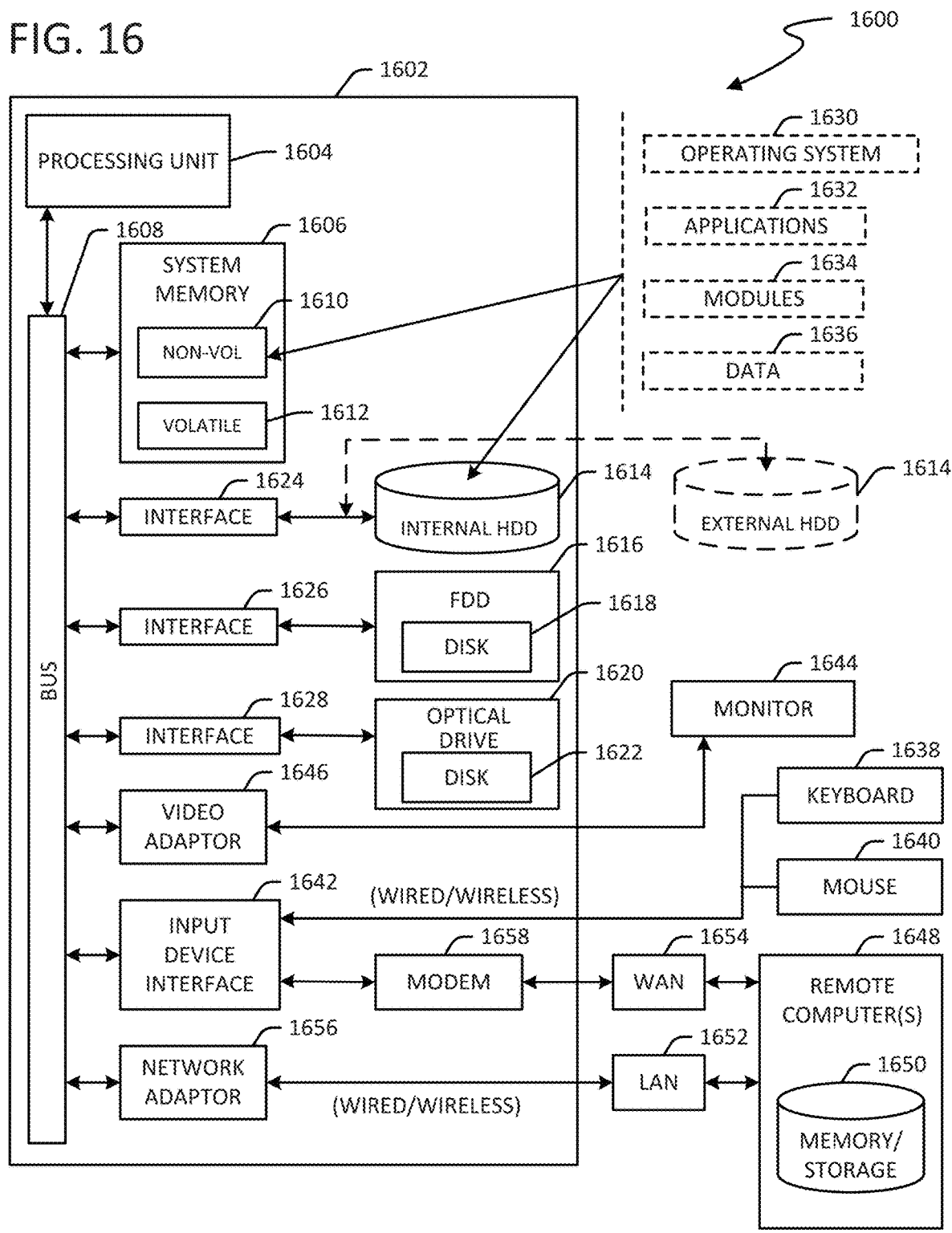

MULTI-FACTOR AUTHENTICATION (MFA) ARRANGEMENTS FOR DYNAMIC VIRTUAL TRANSACTION TOKEN GENERATION VIA BROWSER EXTENSION

TECHNICAL FIELD

Examples described herein are generally related to multi-factor authentication (MFA) arrangements (e.g., methods, programs, apparatus, systems, etc.) for dynamic virtual transaction token generation, and are more specifically related to arrangements requiring additional MFA in certain instances of dynamic virtual transaction token (e.g., virtual credit card token) generation via a browser extension.

BACKGROUND

Many users access information on the Internet using software applications which may include web browser applications. Web browser applications interpret various languages in which information on the Internet is written, such as hypertext markup language (HTML) or an extensible markup language (XML), to present information to users in a user-readable format.

A browser extension application is a software application which is downloadable by a user and installed on the user's computing device, to work in conjunction with the web browser application in order to offer additional functionality via the browser. That is, when the user accesses the Internet through a web browser application, the browser extension application provides the user with additionally functionality within the web browser application.

As one example functionality, a browser extension application may be configured to allow a user to request a transaction token useable to conduct a transaction across the Internet. For example, a browser extension application may allow a user to request a transaction token from a financial service provider (FSP) (e.g., banking) institution, where the transaction token is useable for providing payment to a vendor (e.g., merchant) in exchange for purchase of some type of goods or services via the Internet. As one non-limiting example, the transaction token (and thus the across-internet payment) may be via a virtual credit card used to purchase goods (e.g., electronics, toys, etc.) which would then be subsequently delivered via a delivery service. As another example, the goods purchased may be digital goods (e.g., movies, software) which themselves are delivered (e.g., downloaded) digitally across the Internet.

As to use of browser extension applications to allow users to request transaction tokens, needed are arrangements providing dynamic real-time or near-real-time request and provisioning of transaction tokens, while taking into account the competing interests of fraud prevention and convenience of use.

SUMMARY

Provided are arrangements requiring additional multi-factor authentication (MFA) in certain instances of dynamic virtual transaction token (e.g., virtual credit card token) generation via a browser extension. That is, arrangements providing dynamic real-time or near-real-time request and provisioning of transaction tokens, while taking into account the competing interests of fraud prevention and convenience of use.

Some embodiments are directed to a browser extension embodied on a non-transitory, machine-readable medium, the browser extension, when executed, causing a browser to perform operations of: requiring a user to complete an initial multi-factor authentication (MFA) when the browser extension does not have a record indicating a prior valid initial MFA for the user; and once the browser extension does have a record indicating a prior valid initial MFA for the user: allowing a user to request a transaction token while providing indication of whether a value needed for the transaction token exceeds a predetermined value; allowing the transaction token to be issued when the indication indicates that the value needed does not exceed the predetermined value; requiring the user to complete another MFA when the indication indicates that the value needed does exceed the predetermined value; allowing the transaction token to be issued when the indication indicates that the value needed does exceed the predetermined value and the user successfully completes the another MFA.

Some other embodiments are directed to a browser extension embodied on a non-transitory, machine-readable medium, the browser extension, when executed, causing a browser to perform operations of: requiring a user to complete a multi-factor authentication (MFA) when the browser extension does not have a record indicating a prior valid MFA for the user; and once the browser extension does have a record indicating a prior valid MFA for the user: allowing a user to request a transaction token; maintaining at least one of a maximum number or value of transaction tokens which are allowable within a predetermined period without requiring another MFA; monitoring a cumulative number or value of transaction tokens issued within a most recent running period; allowing the transaction token to be issued when the cumulative number or value of transaction tokens issued within the most recent running period, does not exceed the maximum number or value of transaction tokens; requiring the user to complete another MFA when the cumulative number or value of transaction tokens issued within the most recent running period, does exceed the maximum number or value of transaction tokens; allowing the transaction token to be issued when the cumulative number or value of transaction tokens issued within the most recent running period does exceed the maximum number or value of transaction tokens, and the user successfully completes the another MFA.

Still further embodiments are directed to a browser extension embodied on a non-transitory, machine-readable medium, the browser extension, when executed, causing a browser to perform operations of: requiring a user to complete a multi-factor authentication (MFA) when the browser extension does not have a record indicating a prior valid MFA for the user; and once the browser extension does have a record indicating a prior valid MFA for the user: allowing a user to request a transaction token while providing indication of whether a value needed for the transaction token exceeds a predetermined value; maintaining a MFA validity period for which a MFA remains valid without requiring another MFA, and maintaining at least one of a threshold number or value of transaction tokens which are allowable within a predetermined running period without requiring the another MFA; monitoring a cumulative time since a last MFA was performed, and a cumulative number or value of transaction tokens issued within a most recent running period; allowing the transaction token to be issued when the last MFA was performed within the MFA validity period; allowing the transaction token to be issued when the last MFA was not performed within the MFA validity period, but the cumulative number or value of transaction tokens issued within a most recent running period does not exceed the threshold number or value of transaction tokens; requiring the user to complete another MFA when both the last MFA was not performed within the MFA validity period and the cumulative number or value of transaction tokens issued within a most recent running period does exceed the threshold number or value of transaction tokens; and allowing the transaction token to be issued when the user successfully completes the another MFA.

In some embodiments, the transaction token is a virtual credit card, and the threshold value is a predetermined monetary amount.

Further, in some embodiments, operation of the browser extension is device specific, requiring that the user perform an initial MFA after reinstalling the browser extension onto a same device, or after installing the browser extension onto a new device.

Still in other embodiments, included are operations of: maintaining a merchant-specific threshold number or value of transaction tokens for each merchant in a list of differing merchants; and selecting the merchant-specific threshold number or value of transaction tokens of a merchant with which the transaction token is to be transacted, as the threshold number or value of transaction tokens.

In additional embodiments, included are operations of: maintaining a situation-specific threshold number or value of transaction tokens for each predetermined situation in a list of differing predetermined situations; and selecting the situation-specific threshold number or value of transaction tokens of a predetermined situation in which the transaction token is to be transacted, as the threshold number or value of transaction tokens.

Still other embodiments include operations of: maintaining a merchant-specific MFA validity period for each merchant in a list of differing merchants; and selecting the merchant-specific MFA validity period of a merchant with which the transaction token is to be transacted, as the MFA validity period.

Further embodiments include operations of: maintaining a situation-specific MFA validity period for each predetermined situation in a list of differing predetermined situations; and selecting the situation-specific MFA validity period of a predetermined situation in which the transaction token is to be transacted, as the MFA validity period.

It is to be understood that both the foregoing general description and the following detailed description are exemplary and explanatory only and are not restrictive of the disclosed embodiments, as claimed.

BRIEF DESCRIPTION OF THE DRAWINGS

FIG. 8 illustrates yet another example flow chart algorithm conducted by token application and authentication applications of the FIG. 1 example system.

FIG. 9 illustrates a further example flow chart algorithm conducted by token application and authentication applications of the FIG. 1 example system.

FIGS. 10-14 illustrate example database contents.

FIG. 16 illustrates an embodiment of a computing architecture such as a server.

DETAILED DESCRIPTION

Reference will now be made in detail to the disclosed embodiments, examples of which are illustrated in the accompanying drawings.

Figure 1:
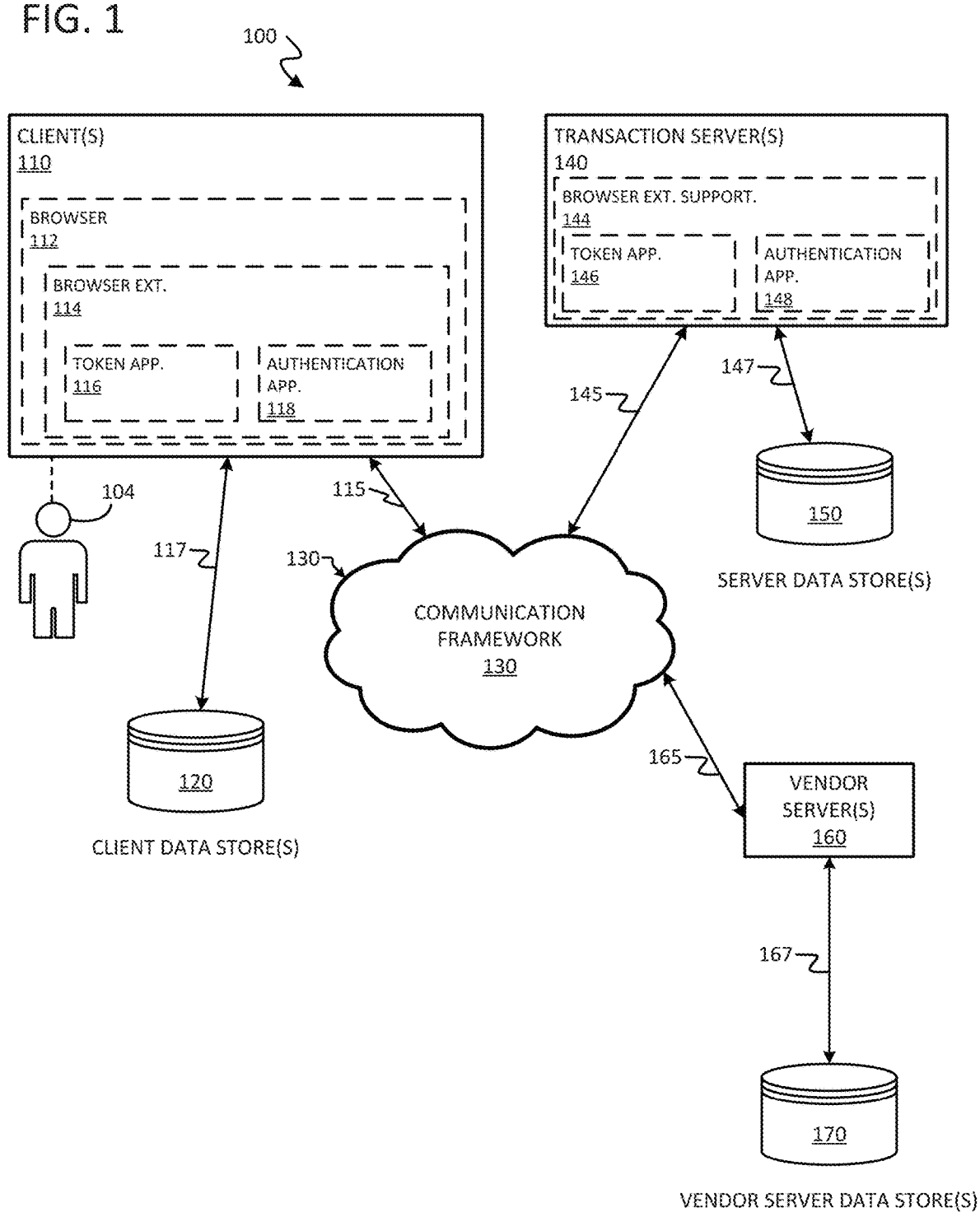
FIG. 1 illustrates a block diagram example of a communication architecture (e.g., networked system) facilitating transaction token request, provisioning and use, as well as requester authentication.

FIG. 1 is a block diagram of communication architecture 100 (e.g., networked system) which facilitates transaction token request, provisioning and use, as well as requester authentication. Components in architecture 100 may be configured for performing browser extension functionality (including transaction token and authentication processes) consistent with disclosed embodiments. The embodiments, however, are not limited to implementation by the communications architecture 100.

As shown in FIG. 1, the communications architecture 100 includes one or more clients 110, one or more transaction servers 140, and one or more vendor servers 160. While only one client 110, transaction server 140 and vendor server 160 are shown for sake of simplicity and brevity, it will be understood that architecture 100 may include more than one of any of these components. That is, the components and arrangement of the components included in architecture 100 may vary. Further, architecture 100 may include other components that perform or assist in the performance of one or more processes consistent with the disclosed embodiments.

In further detail, the client 110, transaction server 140 and vendor server 160 are operatively connected to one another via combinations of paths 115, 145 and 165, and communication framework 130. The paths 115, 145 and 165 may be any type of hardwired, wireless, optical, etc. path(s), or combination thereof. Further, client 110, transaction server 140 and vendor server 160 are illustrated connected to one or more respective client data store 120, server data store 150 and vendor server data store 170 via the paths 117, 147 and 167, respectively. Such stores can be employed to store information such as programs, cookies and/or associated contextual information. The paths 117, 147 and 167 may be any type of hardwired, wireless, optical, etc. path(s), or combination thereof.

Ones of the client 110, client data store 120, transaction server 140, server data store 150, vendor server 160 and vendor server data store 170 may exist at differing geographic locations. For example, the client 110 and client data store 120 might be maintained at a residence, business, etc., or on a person of the user 104 (e.g., user's cell phone). The transaction server 140 and server data store 150 might be maintained at a facility of the FSP or at a non-FSP facility (e.g., server farm) per contract between the FSP and a third-party server provider. The vendor server 160 and vendor server data store 170 might be maintained at a facility of the vendor or at a non-vendor facility (e.g., server farm) per contract between the vendor and a third-party server provider.

The client 110, transaction server 140 and vendor server 150 may communicate information between each other via the communication framework 130. The communications framework 130 may implement any well-known communications techniques and protocols. As non-limiting examples, the communications framework 130 may be implemented as a packet-switched network (e.g., public networks like the Internet, private networks like an enterprise intranet, and so forth), a circuit-switched network (e.g., public switched telephone network), or a combination of thereof and other networks.

Any network of the communications framework 130 may implement various network interfaces arranged to accept, communicate, and connect to another network. A network interface may be regarded as a specialized form of an input-output interface. Network interfaces may employ connection protocols including without limitation: direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types.

For example, multiple network interfaces may be employed to allow for the communication over broadcast, multicast, and unicast networks. Still further, communications network may be any one or combination of wired and/or wireless networks including without limitation: a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Alternatively, at least a portion of the communication framework 130 may in some embodiments, be considered a "cloud". The term "cloud" is a shorthand reference to cloud computing infrastructure. The cloud includes one or more communication networks, such as the Internet, for example, and can further include portions of an industrial communications network, such as a local area network (LAN) or a wide area network (WAN). In cloud computing, a computing process may run on one or many connected cloud computers at the same time. In cloud computing, the cloud can host and run an application anywhere in the world. Further, the cloud enables access to the application from anywhere. Still further, the cloud may include a network or association of connected computer devices and digital electronic resources that can be used to perform processing and to relay communications.

The client 110 may also be termed as a first computing device associated with a user 104. Although a real-life practical system would include many clients and computing devices, only a single client and computing device is being illustrated and described in FIG. 1 for the sake of simplicity and brevity. The first computing device may be configured to execute, among other programs, a web browser application 112 as well as a browser extension application 114 which may include token and authentication applications 116, 118.

Browser 112 may be one or more software applications configured to perform operations consistent with allowing the user 104 to search for and access websites, and exchange information with the Internet. Browser 112 access may be configured to interpret the various languages in which information on the Internet is written, such as hyper-text markup language (HTML) or an extensible markup language (XML), so as to present the information to users in a user-readable format.

Browser extension 114 may be one or more software applications configured to perform operations consistent with providing the user 104 with additional functionality within the web browser application. One non-limiting such functionality might be providing a user with selectable icons and operative (e.g., fillable) interface windows useable in requesting a transaction token.

A secure transaction token (hereinafter, sometimes "token") may, for example, be a generated identifier that maps back to underlying data. For example, the token may be an identifier to identify an individual and/or a prior session conducted previously with the individual. As another example, the token may be a secure token in a form of a generated identifier that maps back to a primary account number (PAN) (e.g., a 16-digit PAN provided on a financial service product such as a credit card) or other identifier. A content, format, etc., of the secure token identifier may be formulated in limitless differing ways, for example, selected: as a randomly generated identifier; from a predetermined list of available token identifiers; via conversion from a PAN or some other user-related information using some predetermined algorithm; etc. The secure token identifier may be nonreversible, meaning that the underlying data cannot be discovered through decryption of the secure token.

For purposes of this disclosure, the transaction token will be described as being useable, for example, to conduct a transaction across the Internet. As one non-limiting example, the transaction token may be a virtual credit card useable for providing payment to a vendor (e.g., merchant) in exchange for the purchase of some type of goods or services across the Internet. The transaction token may be mapped to a financial service (e.g., actual credit card) account of the user 104, where the account is maintained by a FSP.

The FSP may be a financial service entity that provides, maintains, manages, or otherwise offers financial services. For example, the FSP may be a bank, credit union, loan company, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

Given that a user owns his/her financial account and the account is maintained under the responsibility of the FSP, both the user and the FSP have a strong common interest in wanting to avoid becoming the victims of fraud resulting in financial loss. Thus, in order better to provide security in connection with the use of the browser extension 114 (including the transaction token request and authentication functionalities), the browser extension may be software developed and provided by the FSP as a convenience and security service to their customers (e.g., user 104).

One extreme way in which the FSP might best protect itself against financial loss from fraud would be to configure browser extension functionality to require user 104 to perform predetermined authentication at every transaction token request. However, authentication at every transaction token request may be inadvisable when it comes to maintaining a continuing business relationship with the user 104. More particularly, as the user 104 may be intolerant of repetitive entry and/or inconvenience, it may be important that the transaction token request and authentication functionalities operate efficiently and with the limited or reasonable burden on the user 104. Otherwise, the user 104 may avoid, or discontinue, use of the FSP's browser extension. Thereafter, the user may simply choose to use a competitor FSP's token request procedures, and such might disadvantageously result in the user moving his/her financial accounts to the competitor FSP.

In continuing FIG. 1 discussions, transaction server 140 may be one or more computing devices configured to perform operations consistent with maintaining and controlling access to financial service accounts for the FSP, including a financial service account associated with user 104. In some embodiments, transaction server 140 may be further configured to generate content for a display device included in, or connected to, first computing device 110, such as through a mobile banking or other application on first computing device 110. Alternatively, or additionally, transaction server 140 may be configured to provide content through one or more web pages or online portals that are accessible by first computing device 110 over communication framework 130. The disclosed embodiments are not limited to any particular configuration of transaction server 140.

Alternatively, transaction server 140 may be configured with fewer responsibilities including mainly having a browser extension support 144 application (including token and authentication applications 146, 148) configured to perform operations consistent with supporting the functionalities of token and authentication applications 116, 118 of the browser extension 114. That is, transaction server 140 (including token application 146) may be configured to perform operations consistent with assisting with generating secure tokens mapped to financial service accounts maintained by the FSP. Further, transaction server 140 (including authentication application 148) may be configured to perform operations consistent with assisting with user authentication.

As another example, in some embodiments, rather than browser extension support 144 being configured to perform operations consistent with providing authentication application 148, the architecture 100 may further include a separate (i.e., discrete) authentication server configured to perform such operations.

Next, vendor server 160 may be one or more computing devices configured to perform operations consistent with providing web pages that are accessible by first computing device 110 over communication framework 130. For example, the web pages may be viewable at the first computing device 110 through browser application 112. In some embodiments, vendor server 160 may be associated with a merchant that provides goods or services. Further, in some embodiments, the web pages may be online retail web pages through which user 104 may engage in purchase transactions to purchase, rent, etc., the merchant's goods or services. Other web pages are possible as well.

The disclosed embodiments are not limited to any particular configuration of vendor server 160. In some embodiments, vendor server 160 may be one or more other third-party systems configured to provide web pages that are accessible by client 110 over communication framework 130.

It is to be understood that an example configuration and boundaries of the functional building blocks of architecture 100 have been defined herein for the convenience of the description. Alternative boundaries can be defined. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 3:
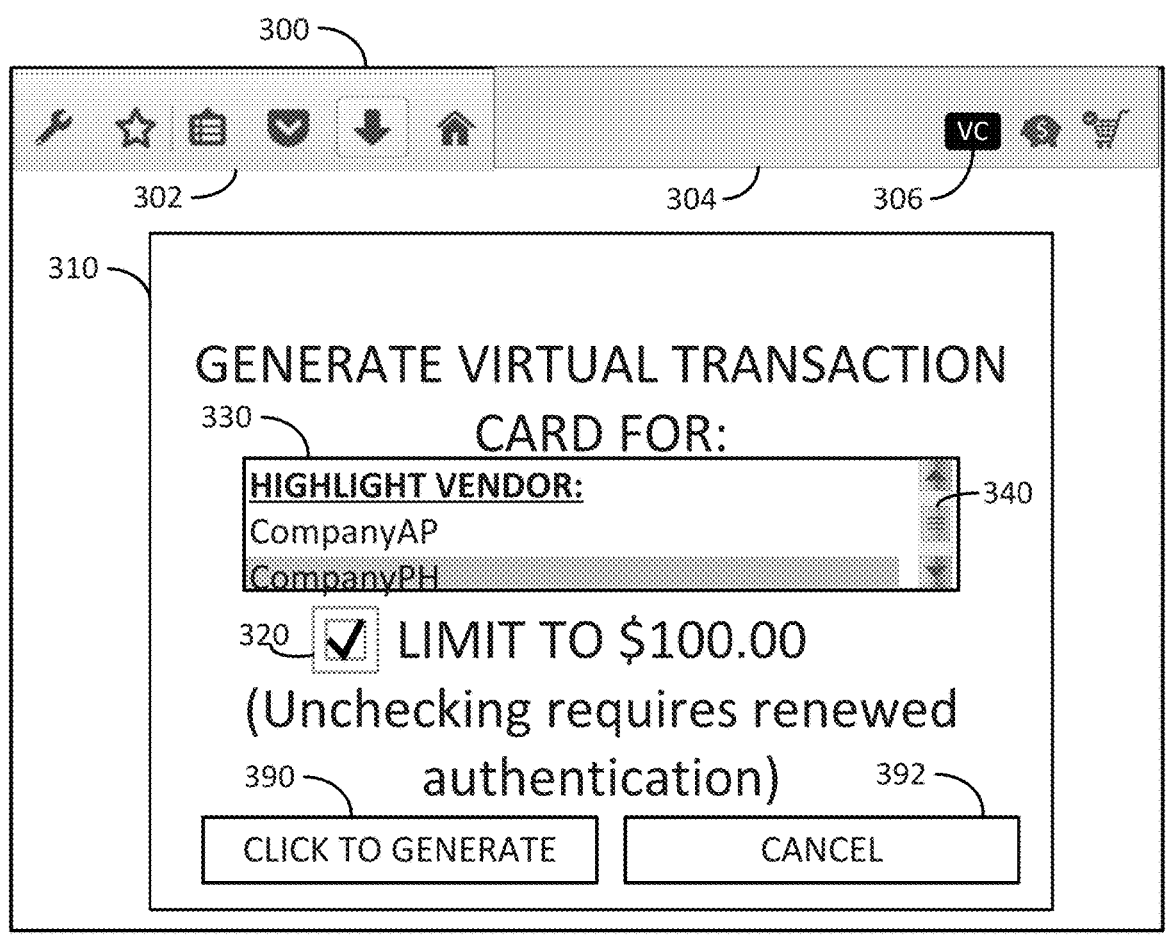
FIGS. 3-6 illustrate example display screen iterations including an example browser and browser extension toolbar, as well as example various windows displayed in connection with a token request and authentication process.

Discussion turns now to transaction token request particulars. More particularly, at any given instance, a user 104 may decide that he/she needs a transaction token to conduct some transaction (e.g., make a purchase). As a portal to initiate a request for a transaction token, the user 104 may view a display of his/her first computing device 110 (e.g., laptop, tablet, etc.). FIG. 3 illustrates an example display screen iteration 300 configured to be include a transaction token request mechanism.

More particularly, ignoring FIG. 3's window 310 for a moment (as it is described in greater detail ahead)), the overall screen iteration 300 (as well as FIGS. 4-7 screen iterations described ahead) includes both a browser toolbar 302 (generated via browser application 112 and having various selectable icons) and a browser extension toolbar 304 (generated via browser extension application 114 and having other various selectable icons). Included as one of the selectable icons within the browser extension toolbar 304, is a selectable transaction token request icon 306, which, in this non-limiting example, is illustratively presented as a virtual credit card icon VC. When a user selects (e.g., mouse clicks) the selectable VC icon 306, a transaction token request algorithm such as example FIG. 2 is initiated.

Figure 2:
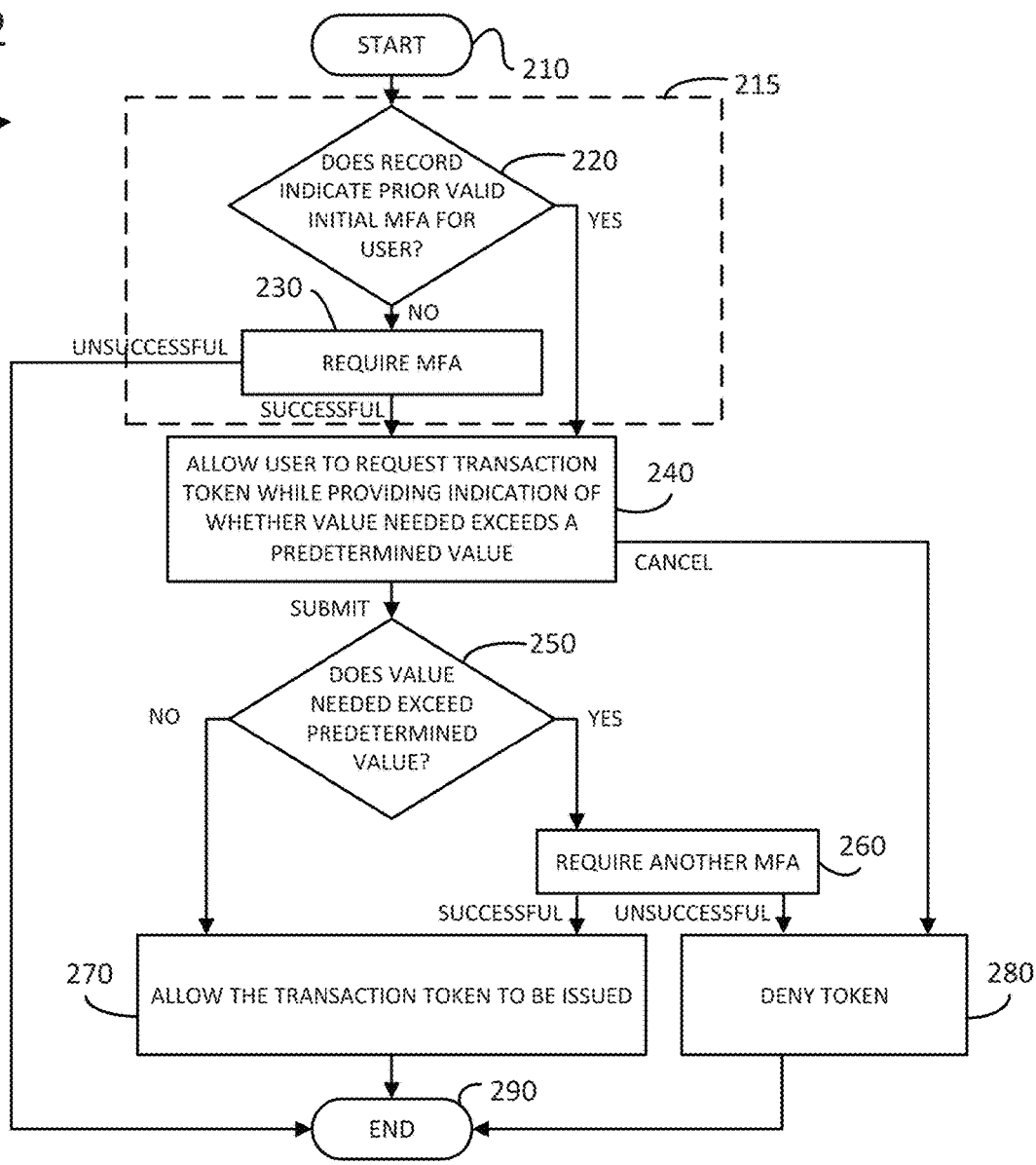
FIG. 2 illustrates an example flow chart algorithm conducted by the token and authentication applications of the FIG. 1 example system.

More particularly, FIG. 2 illustrates an example flowchart algorithm 200 conducted by the token and authentication applications of the FIG. 1 example system. In some embodiments, algorithms such as FIG. 2, 7, 8, 9, etc., might be performed by the browser extension 114 application associated with the first computing device 110 and/or the local client data store 120. For example, the algorithm might be programmed into the browser extension 114 application at the inception of the application, or updated versions might be updated into the browser extension 114 application periodically (e.g., by the transaction server 140). Alternatively, in some embodiments, the algorithm might be performed by the browser extension support 144 application associated with the transaction server 140 and/or the local server data store 150. Again, alternatively, in some embodiments, the algorithm might be performed by a combination of the browser extension 114 and browser extension support 144 applications.

After FIG. 2's "Start" 210, the algorithm 200 checks (operation 220) whether a record (e.g., maintained within the client 110 or transaction server 140) indicates a prior valid initial multi-factor authentication (MFA) for the user 104. If "No", the user is prompted (e.g., via a pop-up window) to provide a required MFA (operation 230). A log-in MFA entry may be similar to that of FIG. 5 described ahead for token request MFA entry. If the user is unable to properly satisfy the MFA entry, operation 230's "Unsuccessful" branch jumps to an "End" 290 operation.

In contrast, if the user is "Successful" in completing the MFA of operation 230, or if the operation 220 check results in a "Yes", the algorithm moves to an operation 240 which automatically pops up a virtual transaction card generation window 310 in FIG. 3's display screen iteration 300.

Initial operations shown enclosed within dashed-box 215 are described as being commonly performed by all of the example FIGS. 2, 7, 8, 9 algorithms given in this disclosure, so redundant description thereof may be avoided in the interest of economy and brevity. However, practice of embodiments is not limited to requiring the performance of such initial operations.

As to the description of general display screen iteration, FIGS. 3-6 illustrate example display screen iterations which are useable with the example FIGS. 2, 7, 8, 9 algorithms, and include example various windows displayed in connection with a token request and authentication process. That is, FIGS. 3-6 represent different window iterations at different times of a same screen on the first computing device 110. In some embodiments, the layout, contents, etc., of the FIGS. 3-6 screen iterations might be dictated by the browser extension 114 application associated with the first computing device 110 and/or the local client data store 120. For example, the layout, contents, etc., of the FIGS. 3-6 screen iterations might be programmed into the browser extension 114 application at inception of the application, or updated versions might be updated into the browser extension 114 application periodically (e.g., by the transaction server 140). Alternatively, in some embodiments, the layout, contents, etc., of the FIGS. 3-6 screen iterations might be dictated by the browser extension support 144 application associated with the transaction server 140 and/or the local server data store 150. Again, alternatively, in some embodiments, the layout, contents, etc., of the FIGS. 3-6 screen iterations might be dictated by a combination of the browser extension 114 and browser extension support 144 applications.

In providing further detail regarding FIG. 3's display window 300, the virtual transaction card generation window 310 is configured (i.e., constructed) to allow the user (if the user should so desire) to provide indication of whether a value needed for the transaction token exceeds a predetermined value. More particularly, as one non-limiting example, provided within the window 310 is a pre-checked box 320 serving as an example default selection which (if unchanged by user 104) limits a value of a requested transaction token to a predetermined maximum amount. Further, below the pre-checked box 320 is textual information warning a user that if the box 320 is unchecked in order to request a transaction token with a higher limit, then renewed authentication will be required.

In the illustrated FIG. 3 example, the FSP has essentially set a policy that any transaction token requests up to a value of $100 would not require any renewed authentication. That is, the FSP's policy to accept a fraud risk for token transactions under $100 is an attempted balance between the FSP's interest in requiring authentication with every token request, and the user 104's intolerance of repetitive entry. More particularly, the FSP's policy has attempted a more reasonable and "user-friendly" way in which the FSP might protect itself (and the user 104) somewhat against financial loss from fraud.

In some embodiments, the transaction token request limit (e.g., threshold) amount may be static. That is, a static set amount which is applied across all token transaction requests of all users and for all vendors. While FIG. 3 illustrates an example $100.00 transaction token request limit, practice of embodiments is in no way limited to such limit amount. For example, a lower $50.00 limit amount, a higher $500.00 limit amount, or any other limit amount might be applied.

In some embodiments, the static transaction token request limit might be dictated by the browser extension 114 application associated with the first computing device 110 and/or the local client data store 120. For example, the limit might be programmed into the browser extension 114 application at inception of the application, or might be updated into the browser extension 114 application periodically (e.g., by the transaction server 140). Having the request limit dictated by the device 110 and/or store 120 is advantageous in allowing the browser extension to operate more independently without granular oversight by the transaction server 140 and without use of communication framework 130 bandwidth. Alternatively, in some embodiments, the limit might be dictated by the browser extension support 144 application associated with the transaction server 140 and/or the local server data store 150. Having the request limit dictated by the server 140 and/or store 150 is advantageous in affording the FSB better centralized oversight and control over request limits. Again, alternatively, in some embodiments, the limit might be dictated by a combination of efforts by the browser extension 114 and browser extension support 144 applications.

In returning to the FIG. 3 virtual transaction card generation window 310, if the user 104 decides that he/she does not wish to submit a transaction token request after all, the user 104 can select (e.g., mouse click) the "Cancel" button 392. The "Cancel" branch from FIG. 2's operation 240 leads to transaction token being denied (FIG. 2 operation 280) with a corresponding display of the FIG. 6 screen iteration 600 including a virtual transaction denial window 610. While the FIG. 6 window 610 illustrates a more generic message of "Your Virtual Transaction Card Cannot Be Generated At This Time", any type of message may be used. For example, in situations where the user 104 has aborted the transaction token request (e.g., by mouse-clicking the "Cancel" button), alternative text such as "Transaction Card Request Canceled by User Request" might be used. Upon noting the denial, the user 104 may select (e.g., mouse click) the close button 690, which would affect a closing of the window 610 from the screen iteration 600. FIG. 2's algorithm 200 would then move to an "End" operation 290.

Figure 4:
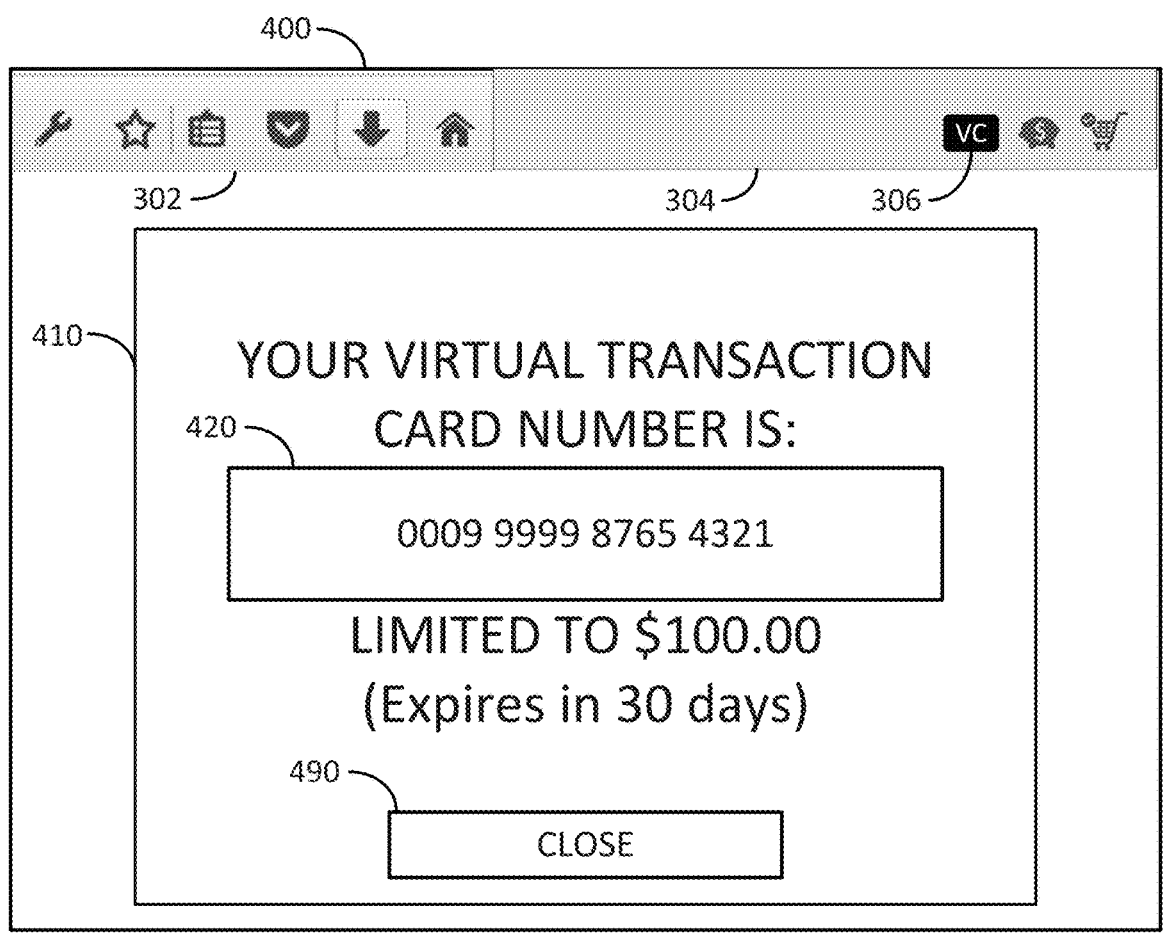

Alternatively, if the user 104 decides that he/she does wish to "Submit" a transaction token request, the user 104 can select (e.g., mouse click) the FIG. 3 "Click To Generate" button 390. FIG. 2's "Submit" branch leads to operation 250 which questions whether the user has de-selected the pre-checked (token amount limit) box 320, i.e., whether the token value needed exceeds the predetermined (token amount limit) value. If not, operation 250's "No", branch leads to the requested transaction token being issued (operation 270), and FIG. 4's screen iteration 400 having virtual transaction card number window 410 is displayed. Such window 410 conveys the transaction token 420 to the user 104. In the FIG. 4 illustrated example, the transaction token is given in a form of a 16-digit identifier (e.g., "0009 9999 8765 4321") that maps back to an undisclosed primary account number (PAN; e.g., a 16-digit PAN) provided on a financial service product such as a credit card. Although not shown, the virtual transaction card number window 410 may further provide (as part of the transaction token) a Card Verification Value (CVV) and an expiration date designated for the transaction token. The transaction token, CVV and expiration date may be needed for entry into the merchant fields for validation.

In some embodiments, the transaction token 420 might be assigned by the browser extension 114 application associated with the first computing device 110 and/or the local client data store 120. For example, transaction token generation functionality might be programmed into the browser extension 114 application at inception of the application, or might be updated into the browser extension 114 application periodically (e.g., by the transaction server 140). Having the transaction token assigned by the device 110 and/or store 120 is advantageous in allowing the browser extension to operate more independently and without use of communication framework 130 bandwidth. Alternatively, in some embodiments, the transaction token 420 might be assigned by the browser extension support 144 application associated with the transaction server 140 and/or the local server data store 150. Having the transaction tokens assigned by the server 140 and/or store 150 is advantageous in affording the FSB better centralized oversight and control over assigned transaction tokens. Again, alternatively, in some embodiments, the transaction token 420 might be dictated by a combination of the browser extension 114 and browser extension support 144 applications.

In addition, any information for mapping the transaction token 420 back to the undisclosed primary account number (PAN) might, in some embodiments, be maintained within the first computing device 110 and/or the local client data store 120. For example, stored into a secure (e.g., encrypted) database maintained within the first computing device 110 and/or the local client data store 120, and only provided back to the FSP periodically. Alternatively, in some embodiments, information for mapping might be maintained within a secure (e.g., encrypted) database in the transaction server 140 and/or the local server data store 150. Again, alternatively, in some embodiments, information for mapping might be maintained within secure (e.g., encrypted) databases of any combination of the first computing device 110, local client data store 120, transaction server 140 and local server data store 150. Still further, portions of the information for mapping might be stored distributed across at least two of the databases (e.g., existing at differing geographic locations, respectively). Alternatively, duplicate copies of the mapping back data might be redundantly stored into at least two databases (e.g., existing at differing geographic locations, respectively).

By way of example, the database(s) described herein may include Oracle™ databases, Sybase™ databases, or other relational databases or non-relational databases, such as Hadoop® sequence files, HBase™, or Cassandra™. Such database(s) may include computing components (e.g., database management system, database server, etc.) configured to receive and process requests for data stored in memory devices of the database(s) and to provide data from the database(s).

Continuing with FIG. 4, the virtual transaction card number window 410 may present additional information. For example, may present information that the virtual transaction card number is "Limited to $100.00", and/or "Expires in 30 days". Practice of embodiments is not limited to the FIG. 4 illustrated and described information.

Upon noting the virtual transaction card number, the user 104 may select (e.g., mouse click) the "Close" button 490, which would affect a closing of the window 410 from the screen iteration 400. FIG. 2's algorithm 200 would then move to an end operation 290.

Regarding further portions of FIG. 2, if the answer to question 250 of whether the token value needed exceeds the predetermined (token amount limit) value is "Yes" (i.e., the user has un-checked the pre-checked box 320), another MFA is deemed required as shown by operation 260. In this example, the FSP has set a policy that it is unwilling to take the risk of fraud for transaction tokens above its predetermined limit (maximum; threshold), and requires another MFA in order to issue the requested token. Operation 260 causes FIG. 5's screen iteration 500 having an example MFA requirement window 510 to be displayed. Such window 510 conveys the types and numbers of MFA needed from the user 104.

Figure 5:
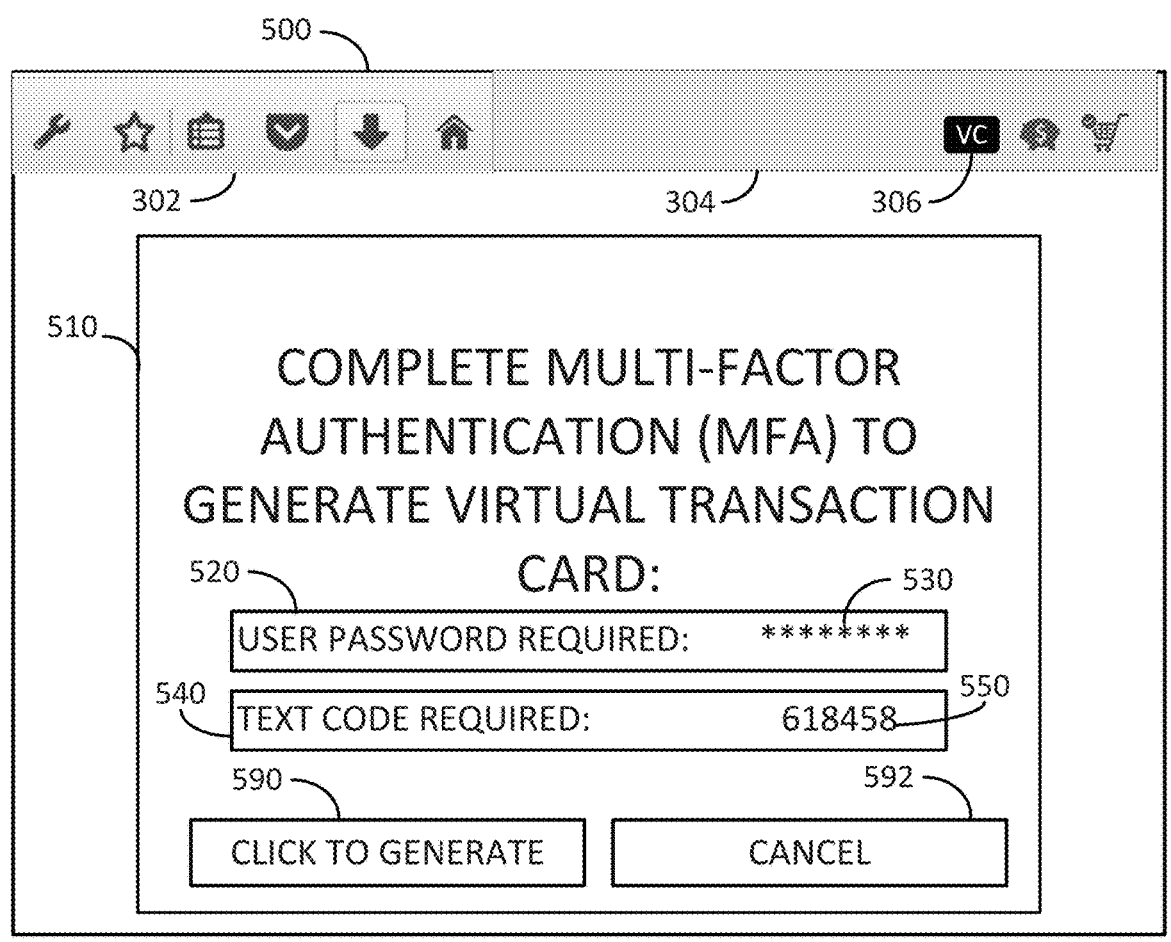

In the FIG. 5 illustrated example, a "User Password Required" fillable field 520 is displayed. Such field 520 may (in some embodiments) be prefilled with the user's password 530 to provide the user 104 with such convenience owing to the fact that the user 104 would have already been required to enter his/her password to gain access to the functionality of the browser extension 114 application. Alternatively, in some embodiments, the user 104 may be required to manually enter his/her password 530 into the fillable field 520. Further in the FIG. 5 illustrated example, a "Text Code Required" fillable field 540 is displayed. The user 104 is required to enter a multi-digit numeric or alphanumeric code 550 such as "618458" into the fillable field 540. The multi-digit code 550 may, in some embodiments, be a PIN (personal identification number) previously assigned in advance to the user 104, or alternatively, may be a dynamic code texted or emailed (e.g., by the FSP via the transaction server 140) to the user 104's personal cell phone or email address, and being useable or valid for only a limited period of time (e.g., 5 minutes).

In some embodiments, correct entry of one or the other (i.e., either) of the password 530 and multi-digit code 550 may be sufficient to successfully complete authentication. Alternatively, in some embodiments, correct entry of both the password 530 and multi-digit code 550 may be required.

Practice of embodiments is not limited to the FIG. 5 illustrated and described example number of differing MFA types displayed, or to the specific MFA types shown and used. That is, a smaller or greater number of MFA types may be displayed, and MFA types other than those shown in the FIG. 5 example may be shown and used. Examples of other MFA types might include: an alphanumeric code, a personal identification number, a customer pattern, biometric data, an answer to a security question, and/or other personal information.

If the user 104 decides that he/she does not wish to submit MFA information after all, the user 104 can select (e.g., mouse click) the "Cancel" button 592. Cancelling (see FIG. 2 operation 260's "Unsuccessful" branch) would result in a transaction token being denied (operation 280) with a corresponding display of the FIG. 6 virtual transaction denial window 610 (previously discussed). FIG. 2's algorithm 200 would then move to an end operation 290.

Alternatively, when the user 104 feels that he/she has completed entry of any required MFA fields 520, 540 in FIG. 5, the user may then select the "Click to Generate" button 590. Then, if the submitted MFA entry or entries match with MFA information prestored for the user 104, the "Successful" branch from FIG. 2's operation 260 leads to the requested transaction token being issued via operation 270 (previously discussed and FIG. 4's virtual transaction card number window 410 (previously-discussed).

Figure 6:
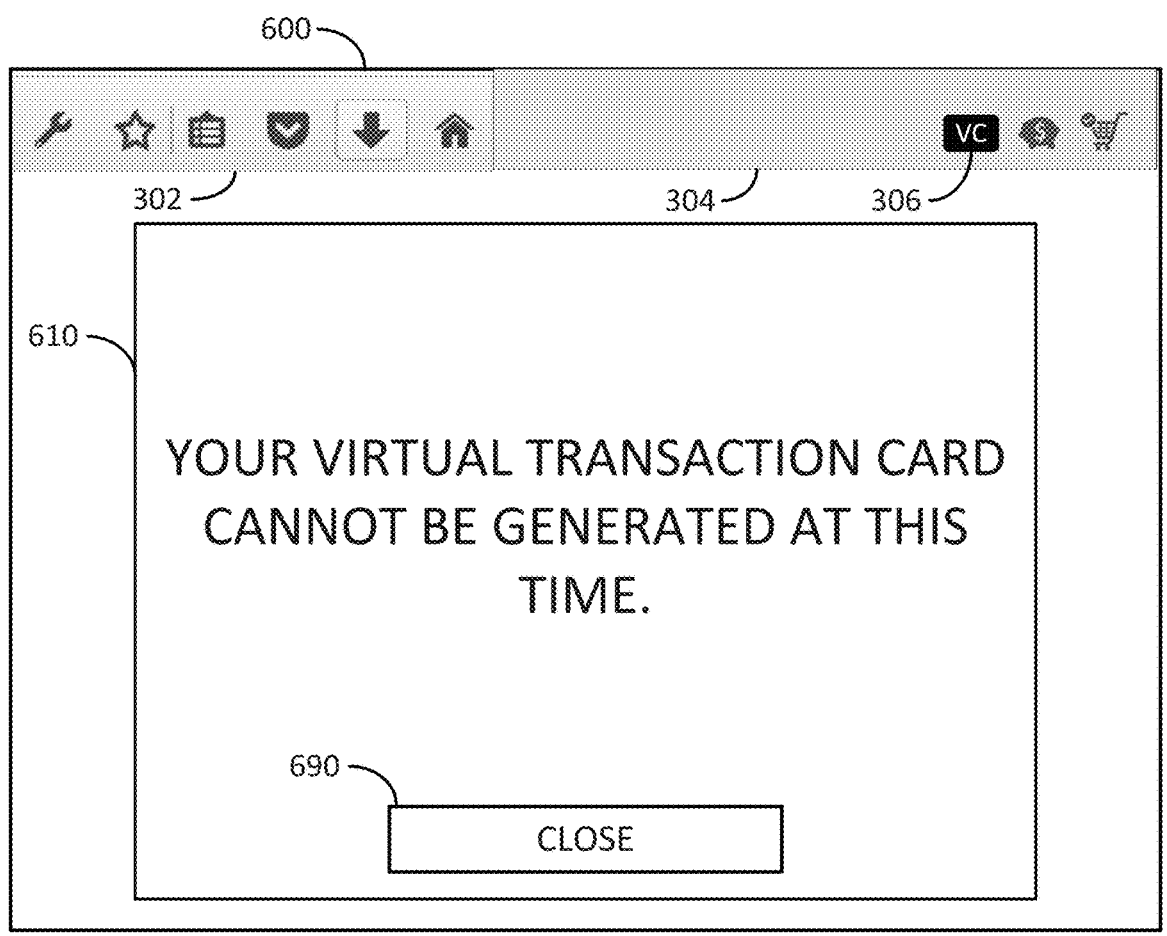

In contrast, if the submitted MFA entry or entries do not match with MFA information prestored for the user 104, the "Unsuccessful" branch from FIG. 2's operation 260 is taken, and the requested transaction token is denied via operation 280 (previously discussed) with a corresponding display of the FIG. 6 virtual transaction denial window 610 (previously discussed). FIG. 2's algorithm 200 would then move to an "End" operation 290.

Discussion turns next to some embodiments where a customized (e.g., individualized) "user-specific" transaction token request limit is set for each respective user, i.e., rather than a common transaction token request limit being universally applied across all users. More particularly, FIG. 10 illustrates an example database 1000 including the feature of user-specific transaction token request limit stored for each of plural users. For present discussions, some columns included are: a Last_Name 1010; a First_Name 1020, a Password 1030, and a user-specific predetermined value USPredVal 1040. Non-mentioned ones of the FIG. 10 columns are discussed later. A first row 1005 of FIG. 10 contains label entries for the respective columns, and remaining rows 1015, 1025, 1035, 1045 . . . each include data with respect to a differing user.

As examples of customized limits, data at rows 1015, 1025 versus column 1040 include a customized user-specific predetermined value USPredVal of $100.00 set for each of the users John Doe and Mary Doe, respectively, whereas row 1035 versus column 1040 includes a customized limit of $50.00 set for Jimmy Doe. Accordingly, if either John Doe or Mary Doe logged onto a computing device and utilized the browser extension (and FIG. 10's database) to perform a transaction token request process, the transaction token request limit presented to them on the FIGS. 3, 4, etc., windows and used by a FIG. 2 algorithm, would be $100.00. In contrast, if Jimmy Doe logged on, the FIGS. 3, 4, etc., windows and the FIG. 2 algorithm would use only a $50.00 limit.

An amount of a user's individualized limit may be set (e.g., by the FSP) based upon a credit score, a perceived credit-worthiness of the user, per the agreement between the FSP and user, etc. The ability to set and use individualized limits on a per-user basis is advantageous in allowing the FSP to further control and limit its financial risks regarding providing transaction token request services to individualized users.

Next, discussion turns to some embodiments where the culmination of a number of tokens requested by a user, triggers the need for another MFA. That is, as an example, FIG. 10's example database 1000 can include the further feature of a predetermined user-specific number of tokens US #Tokens data (see column 1050), which indicates how many tokens may be requested (culminated) by a user before the need for another MFA triggers. The FIG. 10 column 1050 lists "10" tokens if John Doe is logged in as a user, "12" if Mary Doe is logged in as a user, and "4" tokens if Jimmy Doe is logged in as a user.

Figure 7:
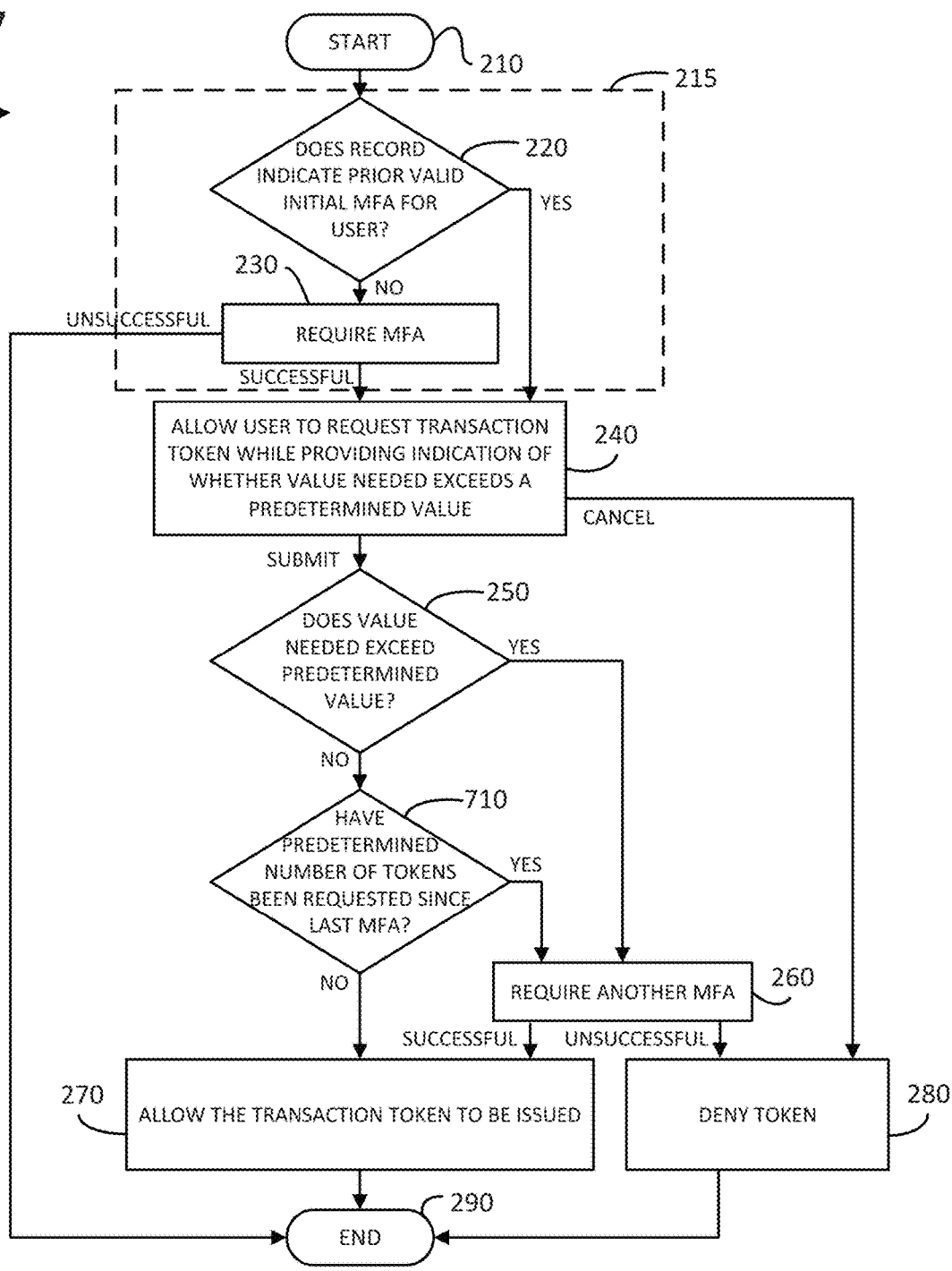
FIG. 7 illustrates another example flow chart algorithm conducted by token application and authentication applications of the FIG. 1 example system.

FIG. 7 illustrates an example flowchart algorithm 700 conducted by the token and authentication applications of the FIG. 1 example system and using the above-mentioned user-specific predetermined value USPredVal 1040 data for triggering the need for another MFA. More particularly, FIG. 7's flow algorithm 700 closely resembles FIG. 2's flow algorithm 200, and accordingly, only differences therebetween will be discussed in the interest of economy and brevity.

More specifically, after FIG. 7's operation 250, an added operation 710 checks if a predetermined number of tokens have been requested since a last MFA. Operation 710 can be configured to remember a time of a last MFA in many ways, for example, via a simple table which stores a time-stamp indicating when each MFA was performed, and then using the time-stamp of the most-recent (last) MFA as a time of the last MFA. Operation 710 can be further configured to monitor a cumulative number of transaction tokens which have been requested since the last MFA. Operation 710 could determine the cumulative number in many ways, for example, via a simple table which stores a time-stamp indicating when each transaction token was requested, and adding up the number of time-stamps having a time equal to or more-recent than the time of the last MFA. Of interest, a time-stamp of operation 240's presently-submitted transaction token request would also be included within the table and would be counted within the cumulative number of transaction tokens requested.

If the cumulative number of transaction tokens requested since the time of the last MFA is less than the predetermined number of tokens US #Tokens data indicated in FIG. 10 column 1050 for the logged-in user, then the "No" branch from FIG. 7's operation 710 is followed to perform next operations 270 and 290 which were previously discussed. In contrast, if the cumulative number of transaction tokens requested is equal to (or greater than) the predetermined number of tokens US #Tokens data, then the "Yes" branch from FIG. 7's operation 710 is followed to perform next operation 260 (previously discussed) to require another MFA. If John Doe is logged in as an example, then FIG. 10's row 1015, column 1050's US #Tokens data would result in another MFA being required each "10" token requests.

While the above column 1050 example was described using a user-specific predetermined (cumulative) number of tokens US #Tokens 1050 in general as triggering the need for another MFA, some embodiments might instead be configured for using a user-specific predetermined (cumulative) value of tokens in general as triggering the need for another MFA.

Next, discussion turns to some embodiments where a cumulative number or cumulative value of tokens obtainable by a user within a given (running) period of time can be limited. As an example, FIG. 10's example database 1000 can include the further features of: an individualized (e.g., customized) user-specific running period USRunPeriod 1060; and a user-specific maximum cumulative token value per running period for the user USMaxVPerP 1064; and/or a user-specific maximum cumulative token number per running period for the user USMaxTPerP 1068. FIG. 10's example database 1000 further includes a user-specific credit limit USCredLimit 1070 set for each respective user. The difference between the user-specific credit limit USCredLimit 1070 and the user-specific maximum cumulative token value USMaxVPerP 1064 is that the cumulative token value USMaxVPerP is akin to a credit limit within a relatively short period of time (i.e., the running period as set via the USRunPeriod 1060), whereas the credit limit USCredLimit 1070 pertains to an overall credit limit preset for the user by the FSP without any time limits.

FIG. 8 illustrates an example flow chart algorithm 800 conducted by the token and authentication applications of the FIG. 1 example system, which will be used to describe some embodiments pertaining to the above-mentioned per-period-limited embodiment. More particularly, after "Start" 810, if the user is "Successful" in completing operation 230's MFA, or if the operation 220 check results in a "Yes", the algorithm moves to an operation 820 which provides a user with the FIG. 3 window (previously discussed) which allows the user (if he/she should so desire) to request a transaction token while providing indication of whether a value needed for the transaction token exceeds a predetermined value.

During operation 820, if the user 104 decides that he/she does not wish to submit a transaction token request after all, the user 104 can select (e.g., mouse click) the "Cancel" button 392 (previously discussed). "Cancel" from operation 820 would result in a transaction token being denied (operation 870) with a corresponding display of the FIG. 6 screen iteration 700 (previously discussed), and FIG. 8's algorithm 800 would move from a deny token 870 operation to an "End" operation 890.

Alternatively, if the user 104 decides that he/she does wish to submit a transaction token request, the user 104 can select (e.g., mouse click) the "Click To Generate" button 390 (previously discussed). The "Submit" branch from FIG. 8's operation 820 would lead to operation 830 which accesses the FIG. 10 database to determine the user-specific running period USRunPeriod 1060, user-specific maximum cumulative token value USMaxVPerP 1064 and/or user-specific maximum cumulative token number USMaxTPerP 1068, as set for the logged-in user 104. Assuming that Mary Doe was logged in, then FIG. 10's row 1025 reveals an individualized (e.g., customized) "4 days" running period, an "$800.00" maximum cumulative token value per running period and/or a "5" maximum cumulative token number per running period, as set for Mary Doe in the database 1000.

After operation 830's lookup, operation 840 monitors a cumulative number or value of transaction tokens which have been requested within a most-recent running period. In the Mary Doe example given above, again the running period in the USRunPeriod 1060 column is set as "4 days". Thus, if a cumulative number of transaction tokens per running period is being monitored, the operation 840 maintains a running or cumulative total of the transaction tokens which Mary Doe has requested over the past four days (i.e., 96 hours). Operation 840 can be configured to maintain the total in many ways, for example, via a simple table which stores a time-stamp indicating when each transaction token was requested, and adding up the number of time-stamps having a time within the past 96 hours. Of interest, a time-stamp of operation 820's presently-submitted transaction token request would be included within the table, and would be counted within the cumulative number of transaction tokens. In some embodiments, transaction tokens which are ultimately not used and/or are declined, may be removed from the table and the removed number would then not be counted within the cumulative total of the transaction token numbers.

Similarly, if a cumulative value of transaction tokens per running period is being monitored, the operation 840 maintains a running or cumulative total of the transaction token values which Mary Doe has requested over the past two days (i.e., 48 hours). Operation 840 can be configured to maintain the total in many ways, for example, via a simple table which stores requested transaction token values in addition to time-stamps indicating when each transaction token was requested, and adding up the transaction token values associated with time-stamps having a time within the past 48 hours. Of interest, a value and time-stamp of operation 820's presently-requested transaction token request would be included within the table, and the value would be counted within the cumulative total of the transaction token values. In some embodiments, transaction tokens which are ultimately not used and/or are declined, may be removed from the table and the removed value would then not be counted within the cumulative total of the transaction token values.

Next, FIG. 8's operation 850 checks whether a cumulative number or cumulative value of tokens requested by the user 104 within the given (running) period of time is being exceeded. That is, in the situation where a cumulative number of transaction tokens per running period is being monitored for Mary Doe, the operation 850 may be configured to compare and determine whether the current (i.e., real-time) cumulative number of transaction tokens requested exceeds a "5" maximum cumulative token number per running period. Alternatively, in the situation where a cumulative value of transaction tokens per running period is being monitored for Mary Doe, the operation 850 may be configured to compare and determine whether the current (i.e., real-time) cumulative value of transaction tokens requested exceeds an "$800.00" maximum cumulative token number per running period.

If "No" (i.e., does not exceed), the requested transaction token is allowed to be issued via operation 860, and FIG. 4's screen iteration 400 having virtual transaction card number window 410 (previously discussed) is displayed to convey the transaction token 420 to the user 104. FIG. 8's algorithm 800 would then move from operation 860 to an "End" operation 890.

If the answer to the operation 850 inquiry is "Yes" (i.e., does exceed), another MFA is deemed required as shown by operation 855, and FIG. 5's screen iteration 500 having an MFA requirement window 510 (previously discussed) is displayed. If the submitted MFA entry or entries match with MFA information stored for the user 104, the "Successful" branch from a bottom of FIG. 8's operation 855 allows the currently-requested transaction token to be issued via operation 860 (previously discussed). FIG. 4's virtual transaction card number window 410 (previously discussed) is used to convey the virtual transaction card number.

In contrast, if the submitted MFA entry or entries do not match with MFA information stored for the user 104, the "Unsuccessful" branch from FIG. 8's operation 855 causes the currently-requested transaction token to be denied via operation 870 (previously discussed) with a corresponding display of the FIG. 6 virtual transaction denial window 610 (previously discussed). FIG. 8's algorithm 800 would then move from operation 870 to an "End" operation 890.

Next, discussion turns to some embodiments where an MFA validity period can be limited in addition to limiting a cumulative number or cumulative value of tokens obtainable by a user within a given (running) period of time. FIG. 10's example database 1000 is again used and further explained. More particularly, in addition to the features/columns previously described, FIG. 10's example database 1000 can further include the features of an individualized (e.g., customized) user-specific authentication lifespan USAuthLspan 1080 for each respective user. As examples, FIG. 10 shows an USAuthLspan of "1 day" set for John Doe (i.e., see row 1015 verses column 1080), "2 days" set for Mary Doe (row 1025), and "1 day" set for Jimmy Doe (row 1035). Column 1095 illustratively represents that other features may be included within the FIG. 10 database.

FIG. 9 illustrates an example flow chart algorithm 900 conducted by the token and authentication applications of the FIG. 1 example system and will be used to describe some embodiments further using the above-mentioned MFA validity period.

After "Start" 910, and if the user is "Successful" in completing operation 230's MFA, or if the operation 220 check results in a "Yes", the algorithm moves to an operation 920 which provides a user with the FIG. 3 window (previously discussed) allowing the user (if he/she should so desire) to request a transaction token while providing indication of whether a value needed for the transaction token exceeds a predetermined value.

During operation 920, if the user 104 selects (e.g., mouse clicks) the "Cancel" button 392 (previously discussed), the "Cancel" branch would result in a transaction token request being denied (operation 990) with a corresponding display of the FIG. 6 virtual transaction denial window 610 (previously discussed). FIG. 9's algorithm 900 would then move from the operation 990 to an "End" operation 995.

Alternatively, with operation 920, if the user 104 decides to "Submit" a transaction token request, then FIG. 9's operation 930 accesses the FIG. 10 database to determine a MFA validity period associated with a logged in user, where the MFA validity period indicates how long the MFA remains valid (e.g., for some operations). Assuming that Jimmy Doe is currently logged in, then operation 930 would determine Jimmy Doe's "1 day" MFA validity period via accessing FIG. 10's Jimmy Doe row 1035 verses USAuthLspan column 1080.

Next, FIG. 9's operation 940 accesses the FIG. 10 database to determine a threshold number or threshold value of tokens obtainable by a user 104 within a given (running) period of time, before another MFA would be required for the user. FIG. 10's previously-described USMaxVPerP 1064 column may alternatively be considered as a threshold value (rather than being considered a maximum cumulative token value) per running period. Similarly, FIG. 10's previously-described USMaxTPerP 1068 column may alternatively be considered as a threshold number (rather than being considered a maximum cumulative token number) per running period. Again, with assuming that Jimmy Doe was logged in, then FIG. 10's Jimmy Doe row 1035 reveals an individualized (e.g., customized) "2 days" running period in the USRunPeriod 1060 column, a "$100.00" threshold value per running period in the USMaxVPerP 1064 column, and a "2" threshold number per running period in the USMaxTPerP 1068 column.

After operation 940's lookup, operation 950 monitors a cumulative time since a last MFA was performed, and a cumulative number or value of transaction tokens which have been requested within a most-recent running period. Operation 950 can be configured to monitor the cumulative time in many ways, for example, via a simple table which stores a time-stamp indicating when each MFA was performed, and then using the time-stamp of the most-recent MFA in comparison to a current (real-time) time. The cumulative number or value of transaction tokens requested within a most-recent running period may be determined in the same manner as the above-discussed Mary Doe example.

Next, FIG. 9's operation 960 checks whether an MFA validity period has expired. More particularly, as one non-limiting example, operation 960 can be configured to compare the cumulative time (as discussed immediately above) to see whether it currently exceeds the MFA validity period ("1 day" for the Jimmy Doe example). If "No" (i.e., not expired), the requested transaction token is allowed to be issued (operation 970), and FIG. 4's screen iteration 400 (previously discussed) is displayed to convey the transaction token 420 to the user 104. FIG. 9's algorithm 900 would then move from the operation 970 to an "End" operation 995.

Alternatively, if the answer to FIG. 9's operation 960 is "Yes" (MFA validity period is expired), operation 980 then checks whether a cumulative number or cumulative value of tokens requested by the user 104 within the most-recent (running) period of time exceeds the threshold for the predetermined running period. That is, in the situation where a cumulative number of transaction tokens per running period is being monitored for Jimmy Doe, the operation 980 may be configured to compare and determine whether the current (i.e., real-time) cumulative number of transaction tokens exceeds a "2" token number threshold per running period (USMaxTPerP). Alternatively, in the situation where a cumulative value of transaction tokens per running period is being monitored for Jimmy Doe, the operation 980 may be configured to compare and determine whether the current (i.e., real-time) cumulative value of transaction tokens exceeds a "$100.00" token value threshold per running period (USMaxVPerP).

If "No" (i.e., does not exceed), the requested transaction token is allowed to be issued via operation 970 (previously discussed), and FIG. 4's virtual transaction card number window 410 (previously discussed) is displayed to convey the transaction token 420 to the user 104. FIG. 9's algorithm 900 would then move from the operation 970 to an "End" operation 995.

Alternatively, if the answer to the operation 980 inquiry is "Yes" (i.e., does exceed), another MFA is deemed required as shown by operation 985, and FIG. 5's screen MFA requirement window 510 (previously discussed) is displayed. If the MFA entry or entries entered responsive to operation 985 match with MFA information prestored for the user 104, the "Success" branch from FIG. 9's operation 985 to operation 970 (previously discussed) is taken, and the requested transaction token is allowed to be conveyed via FIG. 4's virtual transaction card number window 410 (previously discussed). FIG. 9's algorithm 900 would then move from the operation 970 to the "End" operation 995.

In contrast, if the MFA entry or entries do not match with MFA information prestored for the user 104, the "Unsuccessful" branch from FIG. 9's operation 985 is taken, and the requested transaction token is denied via operation 990 (previously discussed) with a corresponding display of FIG. 6's virtual transaction denial window 610 (previously discussed). FIG. 9's algorithm 900 would then move from the operation 990 to the "End" operation 995.

Discussion turns next to some embodiments configured for maintaining a merchant-specific predetermined value for each merchant in a list of differing merchants, and selecting the merchant-specific predetermined value of a merchant with which the transaction token is to be transacted, as the predetermined value. More particularly, FIG. 11 illustrates an example database 1100 including the feature of an individualized predetermined value and individualized token limit number stored for each of plural vendors.

The illustrated example database 1100 includes respective columns of: a Last_Name 1110; a First_Name 1120; a Password 1130; a Vendor_A 1140 setting a first vendor A name; a Predet_ValA 1150 setting an individualized predetermined value for vendor A; a #_TokensA, 1160 setting an individualized predetermined number of tokens for vendor A; a Vendor_B 1170 setting a second vendor B name; a Pred_ValB 1180 setting an individualized predetermined value for vendor B; a #_TokensB 1190 setting an individualized predetermined number of tokens for vendor B. Column 1192 illustratively represents that other features may be included within the FIG. 11 database. Further, a first row 1105 contains the label entries for the respective columns, and remaining rows 1115, 1125, 1135, 1145 . . . each include data with respect to a differing user.

As examples of customized limits for respective vendors, row 1115 for user John Doe includes a transaction token request limit of $100.00 in column Pred_ValA and a token limit number of 10 tokens in column #_TokensA as set for token transactions pertaining to CompanyAP, and includes a transaction token request limit of $200.00 in column Pred_ValB and a token limit number of 8 tokens in column #_TokensB as set for token transactions pertaining to CompanyKB. Similarly, row 1125 for user Mary Doe includes a transaction token request limit of $100.00 in column Pred_ValA and a token limit number of 10 tokens in column #_TokensA as set for token transactions pertaining to CompanyPH, and includes a transaction token request limit of $150.00 in column Pred_ValB and a token limit number of 3 tokens in column #_TokensB as set for token transactions pertaining to CompanyBP. Still further, row 1135 for user Jimmy Doe includes a transaction token request limit of $50.00 in column Pred_ValA and a token limit number of 5 tokens in column #TokensA as set for token transactions pertaining to CompanyKA.

In revisiting FIG. 3, the virtual transaction card generation window 310 may, in some embodiments, further include a vendor selection window 330 having an elevator bar 340 allowing a user to scroll through a listing of plural vendors. Such vendor list may, for example, include vendors having been pre-approved by the FSP, vendors having a business relationship with the FSP, etc. A user would mouse click on the elevator bar 340 to scroll to and select (e.g., via a mouse click) a vendor of interest. The selected vendor may then be highlighted in some way within the vendor selection window 330, to provide visual confirmation of selection to the user. FIG. 3 shows the example selection of "CompanyPH".

With the above user selection, the appropriate FIG. 11 database row for the logged-in user 104 would be accessed to determine a transaction token request limit pertaining to the selected company. With the FIG. 3 example of CompanyPH being user selected and with Mary Doe as a logged-in user, the appropriate transaction token request limit would be determined using the FIG. 11 columns 1140, 1150 and row 1125, and the determined transaction token request limit of $100.00 would be displayed. That is, the FIG. 3 virtual transaction card generation window 310 would be dynamically changed (e.g., by the browser extension application 114) to display the database-defined limit for the vendor which is user-selected from the vendor selection window 330.

Next, discussion turns to some embodiments which maintain a situation-specific threshold number or threshold value of transaction tokens for each predetermined situation in a list of differing predetermined situations. Such embodiments select the situation-specific threshold number or threshold value of transaction tokens, dependent upon a predetermined situation in which the transaction token is to be transacted, as the threshold number or value of transaction tokens.

More particularly, FIG. 12 illustrates an example database 1200 which includes respective columns of: a Last_Name 1210; a First_Name 1220; a Password 1230; a Vendor 1240 setting a vendor name; a Pred_Valu1 1250 setting a first predetermined token value limit for the vendor; a Location 1260 of the Vendor; a Category 1270 indicating a type of goods sold by the vendor; a Pred_Valu2 1280 setting a second predetermined token value limit for the vendor. Column 1290 illustratively represents that other features may be included within the FIG. 12 database. Further, a first row 1205 contains the label entries for the respective columns, and remaining rows 1215, 1225, 1235, 1245, 1255, 1265 . . . each include data with respect to a same user but for differing predetermined situations.

While FIG. 3's virtual transaction card generation window 310 was described as only including a vendor selection window 330 having an elevator bar 340 allowing a user to select a vendor from a listing of plural vendors, the window 310 may be configured to further include similar selection windows allowing a user to select other types of situational data akin to those stored in the FIG. 12 database (taken as a non-exhaustive example). That is, the window 310 may further include a "Location" selection window (not shown), a "Category" selection window (not shown), etc.

In some embodiments, the number of selection windows may match the number of situational data types included within the database, while other embodiments may have a fewer number of windows. Further, while some embodiments may require that the user enter a selection in every available (provided) selection window before a request will be considered, other embodiments may accept that the user may enter a selection in fewer than the total number of available selection windows.

In turning to some specific examples, if a logged-in user "John Doe" only entered (selected) "CompanyPJ" as the intended vendor, then an algorithm might access FIG. 12's row 1215 verses Vendor 1240 and Pred_Valu1 1250 columns, to determine that the situation-specific threshold value of transaction tokens for this predetermined situation would be $100.00. That is, the Pred_Valu1 1250 column might represent a default value column in situations where only the vendor name is user-selected, and insufficient additional situational selections have been entered by the user.

As another example, if the logged-in user "John Doe" entered (selected) "CompanyPJ" as the intended vendor, entered "CountryA-East" as the location of the vendor, and entered "Electronics" as the intended category of goods to be purchased, then an algorithm might access FIG. 12's row 1225 verses Vendor 1240, Location 1260, Category 1270 and Pred_Valu2 1280 columns, to determine that the a situation-specific threshold value of transaction tokens for this predetermined situation would be $400.00. As a third example, if the logged-in user "John Doe" entered (selected) "CompanyKA" as the intended vendor, entered "CountryX" as the location of the vendor, then an algorithm might access FIG. 12's row 1255 verses Vendor 1240, Location 1260, and Pred_Valu1 1250 columns, to determine that the a situation-specific threshold value of transaction tokens for this predetermined situation would be $50.00.

With the above-described embodiments determining a situation-specific threshold value based upon situational data, the FIG. 3 virtual transaction card generation window 310 would be dynamically changed (e.g., by the browser extension application 114) to display the determined situation-specific threshold value. Further, the situation-specific threshold value can be used as the token threshold value for any of the FIGS. 2, 7, 8 and 9 algorithms.

While the above FIG. 12 example was described as using situational data to determine a situation-specific threshold value of transaction tokens, some embodiments might instead be configured for using situational data to determine a situation-specific threshold number of transaction tokens.

In continuing, description turns to some embodiments which maintain a merchant-specific MFA validity period for each merchant in a list of differing merchants, and which select the merchant-specific MFA validity period of a merchant with which the transaction token is to be transacted, as the MFA validity period. More particularly, FIG. 13 illustrates an example database 1300 which includes respective columns of: a Vendor 1310 having respective vendor names; and a vendor-specific authorization lifespan VSAuthLspan 1320, for each respective vendor. Column 1330 illustratively represents that other features may be included within the FIG. 13 database. Further, a first row 1305 contains the label entries for the respective columns, and remaining rows 1315, 1325, 1335, 1345 each include data with respect to differing respective vendors.

As examples, FIG. 13 shows a VSAuthLspan of "2 days" for CompanyAP (row 1315), "2 days" for CompanyKB (row 1325) and "1 day" for CompanyPH (Row 1335).

The previously-described FIG. 3 vendor selection window 330 and FIG. 7 flow algorithm 700 together with the FIG. 10 and FIG. 13 databases, can be used to implement the above-described vendor-specific authorization lifespan embodiment. Only differences of previously-discussed FIGS. and present usage of such FIGS. will be discussed in the interest of economy and brevity.

More particularly, responsive to FIG. 3's illustrated user-selection of "CompanyPH", a modified FIG. 7 algorithm would be configured to utilize the "CompanyPH" user-selection to access FIG. 13's appropriate row 1335 verses column 1320 data to determine the vendor-specific authorization lifespan VSAuthLspan for this vendor as "1 day". Further, the modified FIG. 7 algorithm would be configured to recognize and utilize the determined vendor-specific authorization lifespan (1 day) as operation 930's and 960's "MFA Validity Period". That is, the modified FIG. 7 would utilize the FIG. 13 determined vendor-specific authorization lifespan data for the MFA Validity Period, instead of FIG. 10's user-specific authentication lifespan USAuthLspan 1080 data. Other operations of the FIG. 7 algorithm would utilize a remainder of the FIG. 10 example data to effect a remainder of the FIG. 7 operations as previously-discussed.

Next, description turns to some embodiments which maintain a situation-specific MFA validity period for each predetermined situation in a list of differing predetermined situations, and which select the situation-specific MFA validity period of a predetermined situation in which the transaction token is to be transacted, as the MFA validity period. More particularly, FIG. 14 illustrates an example database 1400 which includes respective columns of: a Vendor 1410 having respective vendor names; a Location 1420 where each respective vendor is located; a Category 1430 indicating a general type of goods sold by each respective vendor; a FraudIndx 1440 indicating a level of fraudulent activity detected historically with respect to each respective vendor (100 being high fraudulent activity, and 0 being low fraudulent activity); and a situation-specific authorization lifespan SSAuthLspan 1450, for each respective situation. Column 1460 illustratively represents that other features may be included within the FIG. 14 database. Further, a first row 1405 contains the label entries for the respective columns, and remaining rows 1415, 1425, 1435, 1445, 1455, 1465 each include data with respect to various situations.

As one example, FIG. 14's row 1415 shows a SSAuthLspan 1450 data of "15 days" for a situation including: "CompanyPH" as the Vendor 1410 data; "Country164" as the Location 1420 data; "Electronics" as the Category 1430 of goods data; and "6" (low level of fraud) as the FraudIndx 1440 data. As another example, FIG. 14's row 1455 shows a SSAuthLspan 1450 data of "1 day" for a situation including: "CompanyBP" as the Vendor 1410 data; "Country784" as the Location 1420 data; "Electronics" as the Category 1430 of goods data; and "76" (high level of fraud) as the FraudIndx 1440 data.

The previously-described FIG. 3 vendor selection window 330 and FIG. 7 flow algorithm 700 together with the FIG. 10 and FIG. 14 databases, can be used to implement the above-described situation-specific MFA validity period embodiment. Only differences of previously-discussed FIGS. and present usage of such FIGS. will be discussed in the interest of economy and brevity.

More particularly, FIG. 3's window 310 (including a vendor selection window 330) would be configured to include further selection windows allowing a user to select other types of situational data matching those of the FIG. 14 database, such a "Location" selection window (not shown), a "Category" selection window (not shown), etc.

Assuming an example where there is a user-selection of "CompanyPH" into the vendor selection window 330 (see FIG. 3), user-selection of "Country107" into a "Location" selection window (not shown), and user-selection of "Electronics" into a "Category" selection window (not shown), then a modified FIG. 7 algorithm would be configured to utilize such user-selections to access FIG. 14's row 1435 verses column 1460 data to determine the situation-specific authorization lifespan SSAuthLspan for this situation as "12 days". Further, the modified FIG. 7 algorithm would be configured to recognize and utilize the determined situation-specific authorization lifespan (12 days) as operation 930's and 960's "MFA Validity Period". That is, the modified FIG. 7 would utilize the FIG. 14 determined situation-specific authorization lifespan data for the MFA Validity Period, instead of FIG. 10's user-specific authentication lifespan USAuthLspan 1080 data. Other operations of the FIG. 7 algorithm would utilize a remainder of the FIG. 10 example data to effect a remainder of the FIG. 7 operations as previously-discussed.

Figure 15:
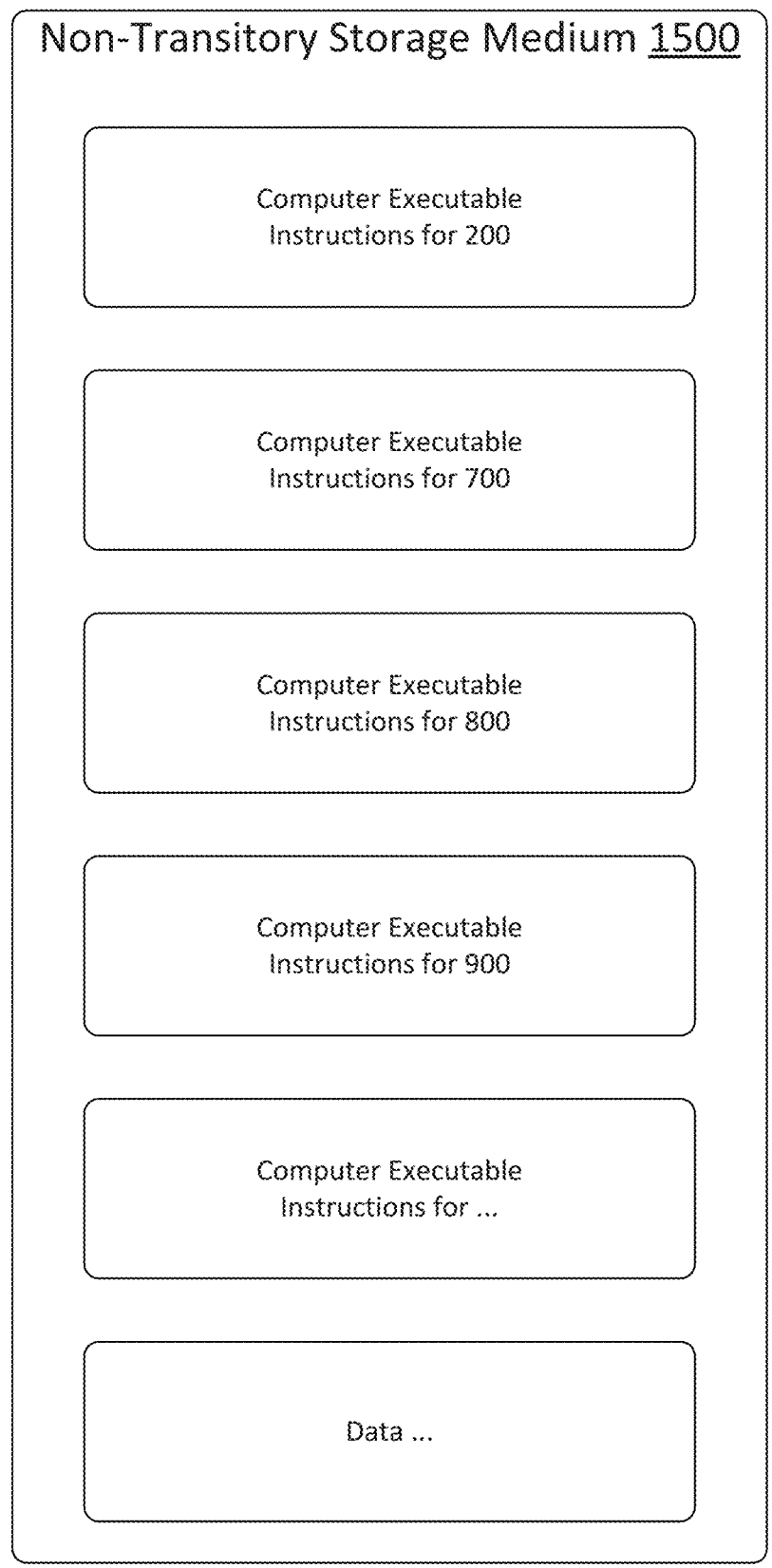
FIG. 15 illustrates an embodiment of a storage medium.

Next, FIG. 15 illustrates an embodiment of a storage medium 1500. Storage medium 1500 may include any non-transitory computer-readable storage medium or machine-readable storage medium, such as an optical, magnetic or semiconductor storage medium. In various embodiments, storage medium 1500 may include an article of manufacture. In some embodiments, storage medium 1500 may store computer-executable instructions, such as computer-executable instructions to implement one or more of logic flows or operations described herein, such as with respect to flow algorithms 200 of FIG. 2, 700 of FIG. 7, 800 of FIG. 8 and 900 of FIG. 9. Storage medium 1500 may also store further computer-executable instructions, such as computer-executable instructions to implement other logic flows or operations, and may also store data. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. Storage medium 1500 may also store various data. The embodiments are not limited in this context.

FIG. 16 illustrates an embodiment of an exemplary computing architecture 1600 that may be suitable for implementing any of the components (e.g., computers, servers, client devices, etc.) of various embodiments as described anywhere within this disclosure. In various embodiments, the computing architecture 1600 may include or be implemented as part of an electronic device. In some embodiments, the computing architecture 1600 may be representative, for example, of a processor server that implements one or more components of the transaction processing system, such as the above-discussed components. In some embodiments, computing architecture 1600 may be representative, for example, of a computing device that implements one or more components of the client 110, transaction server 140 and vendor server 160 arrangements. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1600.

As shown in FIG. 16, the computing architecture 1600 includes a processing unit 1604, a system memory 1606 and a system bus 1608. The processing unit 1604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 1604.

The system bus 1608 provides an interface for system components including, but not limited to, the system memory 1606 to the processing unit 1604. The system bus 1608 can be any of several types of bus structure that may further interconnect to a memory bus (with or without a memory controller), a peripheral bus, and a local bus using any of a variety of commercially available bus architectures. Interface adapters may connect to the system bus 1608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 16, the system memory 1606 can include non-volatile memory 1610 and/or volatile memory 1612. A basic input/output system (BIOS) can be stored in the non-volatile memory 1610.

The computer 1602 may include various types of computer-readable storage media in the form of one or more lower speed memory units, including an internal (or external) hard disk drive (HDD) 1614, a magnetic floppy disk drive (FDD) 1616 to read from or write to a removable magnetic disk 1618, and an optical disk drive 1620 to read from or write to a removable optical disk 1622 (e.g., a CD-ROM or DVD). The HDD 1614, FDD 1616 and optical disk drive 1620 can be connected to the system bus 1608 by a HDD interface 1624, an FDD interface 1626 and an optical drive interface 1628, respectively. The HDD interface 1624 for external drive implementations can include at least one or both of Universal Serial Bus (USB) and IEEE 1594 interface technologies.

The drives and associated computer-readable media provide volatile and/or nonvolatile storage of data, data structures, computer-executable instructions, and so forth. For example, a number of program modules can be stored in the drives and memory units 1610, 1612, including an operating system 1630, one or more application programs 1632, other program modules 1634, and program data 1636. In one embodiment, the one or more application programs 1632, other program modules 1634, and program data 1636 can include, for example, the various applications and/or components of the aforementioned servers of the present disclosure.

A user can enter commands and information into the computer 1602 through one or more wire/wireless input devices, for example, a keyboard 1638 and a pointing device, such as a mouse 1640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1604 through an input device interface 1642 that is coupled to the system bus 1608, but can be connected by other interfaces such as a parallel port, IEEE 994 serial port, a game port, a USB port, an IR interface, and so forth.

A monitor 1644 or other type of display device is also connected to the system bus 1608 via an interface, such as a video adaptor 1646. The monitor 1644 may be internal or external to the computer 1602. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer 1648. The remote computer 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the LAN 1652 through a wire and/or wireless communication network interface or adaptor 1656. The adaptor 1656 can facilitate wire and/or wireless communications to the LAN 1652, which may also include a wireless access point disposed thereon for communicating with the wireless functionality of the adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, connects to the system bus 1608 via the input device interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

It should be appreciated that the example embodiments shown in the block diagram of several FIGS. may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

In the context of the present disclosure, unless expressly provided otherwise, the words "first", "second", "third", etc. have been used as adjectives only for the purpose of allowing for distinction between the nouns that they modify from one another, and not for the purpose of describing any particular relationship between those nouns.

As may or may not have been mentioned previously, various features, operations, etc. of this invention may be practiced "simultaneously", "concurrently" or "parallelly". As used within a content of this invention, the term 'simultaneous' means that two things (e.g., collecting; analyzing, etc., of differing information) happen at the same time (i.e., at least partially occur or overlap in time), while the term 'concurrent' means that the two things may occur during the same period of time, but do not necessarily happen at the same time. Concurrent is the broader term, and may include instances of things occurring simultaneously. If two things (e.g., collecting; analyzing, etc., of differing information) overlap in time partially but not completely, the things may be described as occurring concurrently, while the overlapping portion may be described as occurring simultaneously. Further, the term "parallel" means that two things occur along two differing paths or via differing operations. Parallel may include instances which occur simultaneously, instances which occur concurrently, and/or instances occurring at wholly differing time periods.

In this disclosure, the term "real time" refers to a time scale that is substantially simultaneous to an item or instance which provoked a subsequent action. In contrast, the term "near real time" refers to a time scale that is slower than the time scale referred to as "real time," for example by about one or more orders of magnitude, or by requiring a finite amount of time (e.g., milliseconds) rather than being substantially simultaneous.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A non-transitory machine-readable medium storing program code of a browser extension executable by a processor to:
   determine, by the browser extension, that a record indicating an authentication by a first multi-factor authentication (MFA) does not exist for a user in a memory of a device;
   cause, by the browser extension, a prompt on a user interface on a display to require a user input via a user input device to complete the authentication by the first MFA, wherein operation of the browser extension is device specific, requiring the first MFA be performed after reinstalling the browser extension onto a same device or after installing the browser extension onto a new device;
   receive, by the browser extension via the user input device, the first MFA;
   present, by the browser extension, an option on the user interface for a second user input to request an issuance of a transaction token for a financial transaction;
   receive a request for the issuance of a transaction token via the user input device, wherein the request includes an indication of a value needed for the transaction token;
   maintain a situation-specific predetermined value for each predetermined situation in a list of differing predetermined situations;
   select the situation-specific predetermined value of a predetermined situation in which the transaction token is to be transacted, wherein the situation-specific predetermined value is used as a predetermined value;
   in response to the predetermined situation, retrieve, by the browser extension, the predetermined value and a predetermined number of tokens from the memory of the device, wherein the predetermined value is a monetary amount and the predetermined number of tokens is a number of tokens requested before another MFA is requested;
   determine, by the browser extension, if the value needed for the transaction token exceeds the predetermined value;
   determine, by the browser extension, a number of requested transaction tokens since the first MFA by adding up the number of requested transaction tokens including the transaction token requested in the request for the issuance of the transaction token;
   determine, by the browser extension, if the number of requested transaction tokens exceeds the predetermined number of tokens;
   issue, by the browser extension, the transaction token when the value needed for the transaction token does not exceed the predetermined value and the number of requested transaction tokens does not exceed the predetermined number of tokens;
   present, by the browser extension, a prompt on the user interface for the user to complete a second MFA when the value needed for the transaction token exceeds the predetermined value or the number of requested transaction tokens exceeds the predetermined number of tokens;
   issue the transaction token in response to the second MFA being authenticated; and
   complete the financial transaction with the issued transaction token.

2. The non-transitory machine-readable medium as claimed in claim 1, wherein the transaction token is a virtual credit card, and the value needed for the transaction token is a monetary amount.

3. The non-transitory machine-readable medium as claimed in claim 1, comprising:
   maintaining a merchant-specific predetermined value for each merchant in a list of differing merchants; and
   selecting the merchant-specific predetermined value of a merchant with which the transaction token is to be transacted, as the predetermined value.

4. The non-transitory machine-readable medium as claimed in claim 1, wherein the transaction token includes identifier data mapping back to at least one of: identification of an individual; a prior session conducted previously; a financial service account; or a primary account number (PAN).

5. The non-transitory machine-readable medium of claim 1, wherein when the processor is determining, by the browser extension, that the record indicating the authentication by the first multi-factor authentication, the non-transitory machine-readable medium causes the processor to:

determine whether a user-selected authorized span of time has passed since the first multi-factor authentication.

6. A computing device comprising:
a user-interface device;
a processor;
a memory including browser extension program code, the browser extension program code, when executed by the processor, to cause the processor to:
determine that a record indicating an authentication by a first multi-factor authentication (MFA) does not exist for a user in the memory;
present a prompt on the user-interface device to require a user input to complete the authentication by the first MFA, wherein operation of the browser extension program code is configured as device specific, requiring the first MFA to be performed after reinstalling the browser extension onto a same device or after installing the browser extension onto a new device;
receive, via the user-interface device, the user input including the first MFA;
present an option via the user-interface device for a second user input to request an issuance of a transaction token for a financial transaction, wherein the transaction token is nonreversible;
receive the request for the issuance of a transaction token, wherein the request includes an indication of a value needed for the transaction token;
maintain a situation-specific predetermined value for each predetermined situation in a list of differing predetermined situations;
select the situation-specific predetermined value of a predetermined situation in which the transaction token is to be transacted, wherein the situation-specific predetermined value is used as a predetermined value;
in response to a predetermined situation, retrieve a predetermined value and a predetermined number of tokens from the memory, wherein the predetermined value is a monetary amount and the predetermined number of tokens is a number of tokens requested before another MFA is requested;
determine if the value needed for the transaction token exceeds the predetermined value;
determine a number of requested transaction tokens since the first MFA by summing the number of requested transaction tokens including the transaction token requested in the request for the issuance of the transaction token;
determine, by the browser extension, if the number of requested transaction tokens exceeds the predetermined number of tokens;
issue the transaction token when the value needed for the transaction token does not exceed the predetermined value and a sum of the number of requested transaction tokens does not exceed the predetermined number of tokens;
present a prompt on the user-interface device for the user to complete a second MFA when the value needed for the transaction token exceeds the predetermined value or the number of requested transaction token exceeds the predetermined number of tokens,
issue the transaction token in response to the second MFA being authenticated; and
complete the financial transaction with the issued transaction token.

7. The computing device as claimed in claim 6, wherein the transaction token is a virtual credit card, the value needed for the transaction token is a monetary value, and the predetermined value is a predetermined monetary amount.

8. The computing device as claimed in claim 6, comprising:
a merchant-specific token selector configured to:
access a merchant-specific predetermined value for each merchant in a list of differing merchants; and
select the merchant-specific predetermined value of a merchant with which the transaction token is to be transacted, as the predetermined value.

9. The browser extension as claimed in claim 6, wherein the transaction token includes identifier data mapping back to at least one of: identification of an individual; a prior session conducted previously; a financial service account; or a primary account number (PAN).

10. The computing device of claim 6, wherein when the processor is determining that the record indicating an authentication by the first multi-factor authentication does not exist for the user in the memory, the processor is operable to:
determine whether a user-selected authorized span of time has passed since the first multi-factor authentication.

11. A computer-implemented method, comprising:
determining, by a browser extension executing on a processor, that a record indicating an authentication by a first multi-factor authentication (MFA) does not exist for a user in a memory;
causing, by the browser extension, a prompt on a user interface to require a user input to complete the first MFA, wherein operation of the browser extension is device specific, requiring that the first MFA be performed after reinstalling the browser extension onto a same device or after installing the browser extension onto a new device;
presenting, by the browser extension, an option via the user interface presented on a display device to request an issuance of a transaction token for a financial transaction;
receiving, by the browser extension, the request for the issuance of a transaction token, wherein the request includes an indication of a value needed for the transaction token;
maintaining a situation-specific predetermined value for each predetermined situation in a list of differing predetermined situations;
selecting the situation-specific predetermined value of a predetermined situation in which the transaction token is to be transacted, wherein the situation-specific predetermined value is used as a predetermined value;
in response to the predetermined situation, retrieving, by the browser extension, a predetermined value and a predetermined number of tokens from the memory of the same device or the new device, wherein the predetermined value is a monetary amount and the predetermined number of tokens is a number of tokens requested before another MFA is requested;
determining, by the browser extension, if the value needed for the transaction token exceeds the predetermined value;
determining, by the browser extension, a number of requested transaction tokens since the first MFA by summing the number of requested transaction tokens including the transaction token requested in the request for the issuance of the transaction token;

determining, by the browser extension, if a sum of the number of requested transaction tokens exceeds the predetermined number of tokens;

issuing the transaction token when the value needed does not exceed the predetermined value and the number of requested transaction tokens does not exceed the predetermined number of tokens;

presenting, by the browser extension, a prompt on the user interface to complete a second MFA when the value needed does exceed the predetermined value or the number of requested transaction token does exceed the predetermined number of tokens, issuing the transaction token in response to the second MFA being authenticated; and completing the financial transaction using the transaction token issued in response to the authenticated second MFA.

12. The method as claimed in claim 11, wherein the transaction token is a virtual credit card, and the predetermined value is a predetermined monetary amount.

13. The method as claimed in claim 11, comprising:
maintaining a merchant-specific predetermined value for each merchant in a list of differing merchants; and
selecting the merchant-specific predetermined value of a merchant with which the transaction token is to be transacted, as the predetermined value.

14. The method as claimed in claim 11, wherein the token includes identifier data mapping back to at least one of: an identification of an individual; a prior session conducted previously; a financial service account; or a primary account number (PAN).

15. The computer-implemented method of claim 11, wherein determining, by a browser extension executing on the processor, that the record indicating the authentication by the first multi-factor authentication does not exist for the user in the memory, further includes:
determining whether a user-selected authorized span of time has passed since the first multi-factor authentication.

\* \* \* \* \*